(12) United States Patent
Ganiger et al.

(10) Patent No.: US 12,311,330 B2
(45) Date of Patent: May 27, 2025

(54) SELF-CLEANING CONDUITS FOR HYDROCARBON FLUIDS

(71) Applicant: General Electric Company, Schenectady, NY (US)

(72) Inventors: Ravindra Shankar Ganiger, Bengaluru (IN); Hiranya Nath, Bengaluru (IN); Thomas D. Woodrow, Wyoming, OH (US); Scott Alan Schimmels, Miamisburg, OH (US); Arvind Namadevan, Bengaluru (IN); Mohan Raju, Bengaluru (IN); Subramani Adhiachari, Bengaluru (IN); Prasant Bilaiya, Bengaluru (IN); Rajesh Kumar, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 385 days.

(21) Appl. No.: 18/054,735

(22) Filed: Nov. 11, 2022

(65) Prior Publication Data
US 2024/0001323 A1 Jan. 4, 2024

(30) Foreign Application Priority Data
Jul. 1, 2022 (IN) .............................. 202211037978

(51) Int. Cl.
*B01J 19/00* (2006.01)
*F16N 39/00* (2006.01)

(52) U.S. Cl.
CPC .......... *B01J 19/0026* (2013.01); *F16N 39/00* (2013.01); *F16N 2210/02* (2013.01)

(58) Field of Classification Search
CPC .................................................... B01J 19/0026
See application file for complete search history.

(56) References Cited

U.S. PATENT DOCUMENTS

| | | | |
|---|---|---|---|
| 4,481,154 A | 11/1984 | Gough et al. | |
| 5,194,231 A | 3/1993 | Gough et al. | |
| 5,725,955 A | 3/1998 | Tawil et al. | |
| 5,829,246 A | 11/1998 | Abrams et al. | |
| 6,125,624 A | 10/2000 | Prociw | |
| 6,431,837 B1 | 8/2002 | Velicki | |
| 6,523,350 B1 | 2/2003 | Mancini et al. | |

(Continued)

FOREIGN PATENT DOCUMENTS

| | | |
|---|---|---|
| CN | 103977996 B | 4/2016 |
| CN | 109070152 A | 12/2018 |

(Continued)

OTHER PUBLICATIONS

Eftifeeva et al., "Two-way shape memory effect in [001]B2-oriented Co—Ni—Al single crystals", Materials Today: Proceedings 4, 2017, pp. 4789-4796.

(Continued)

*Primary Examiner* — Jason Y Ko
(74) *Attorney, Agent, or Firm* — McCarter & English, LLP

(57) ABSTRACT

A self-cleaning conduit for a hydrocarbon fluid. The conduit includes a tube and a mesh. The tube has an interior surface defining a flow passage for the hydrocarbon fluid. The mesh is positioned within the flow passage to abut the interior surface and movable along the interior surface to break-up deposits on the interior surface. The mesh is characterized by a mesh activation parameter (MAP) from one ten thousandths to six tenths.

20 Claims, 19 Drawing Sheets

(56) References Cited

U.S. PATENT DOCUMENTS

| | | |
|---|---|---|
| 6,569,255 B2 | 5/2003 | Sivacoe |
| 6,579,628 B2 | 6/2003 | Takeuchi et al. |
| 6,715,292 B1 | 4/2004 | Hoke |
| 6,808,816 B2 | 10/2004 | Mancini et al. |
| 6,989,197 B2 | 1/2006 | Schneider |
| 7,326,469 B2 | 2/2008 | Dye et al. |
| 7,431,981 B2 | 10/2008 | Schneider |
| 8,104,793 B2 | 1/2012 | Browne et al. |
| 8,177,488 B2 | 5/2012 | Manteiga et al. |
| 8,291,710 B2 | 10/2012 | Webster |
| 8,298,656 B2 | 10/2012 | Schneider |
| 8,529,849 B2 | 9/2013 | Pranda et al. |
| 9,062,563 B2 | 6/2015 | Varanasi et al. |
| 9,341,117 B2 | 5/2016 | Remer et al. |
| 10,100,944 B2 | 10/2018 | Calkins et al. |
| 10,196,934 B2 | 2/2019 | Khan et al. |
| 10,683,807 B2 | 6/2020 | McMasters et al. |
| 11,143,170 B2 | 10/2021 | Foutch |
| 11,661,891 B1 | 5/2023 | Janakiraman et al. |
| 2010/0266770 A1 | 10/2010 | Mazany et al. |
| 2017/0370376 A1 | 12/2017 | Kray et al. |

FOREIGN PATENT DOCUMENTS

| | | |
|---|---|---|
| CN | 111303847 A | 6/2020 |
| CN | 113532189 A | 10/2021 |
| GB | 2555598 A | 5/2018 |
| JP | 2015014265 A | 1/2015 |
| WO | 2020243394 A1 | 12/2020 |

OTHER PUBLICATIONS

Dilibal et al., "On the volume change in Co—Ni—Al during pseudoelasticity", Materials Science and Engineering A 528, 2011, pp. 2875-2881.

Li et al., "Martensitic transformation and magnetization of Ni—Fe—Ga ferromagnetic shape memory alloys", Scripta Materialia 48, 2003, pp. 1255-1258.

Sun et al., "Giant negative thermal expansion in Fe—Mn—Ga magnetic shape memory alloys", Applied Physics Letters 113, 2018, pp. 041903-1-041903-5.

Kireeva et al., "Effect of oriented precipitates on shape memory effect and superelasticity in Co—Ni—Ga single crystals", Acta Materialia 68, 2014, pp. 127-139.

Seldin "Stress-Strain Properties of Polycrystalline Graphites in Tension and Compression at Room Temperature", Carbon, vol. 4, 1966, pp. 177-191.

Uchil et al., "Thermal expansion in various phases of Nitinol using TMA", Physica B: Condensed Matter, vol. 270, Issues 3-4, Oct. 1999, pp. 289-297.

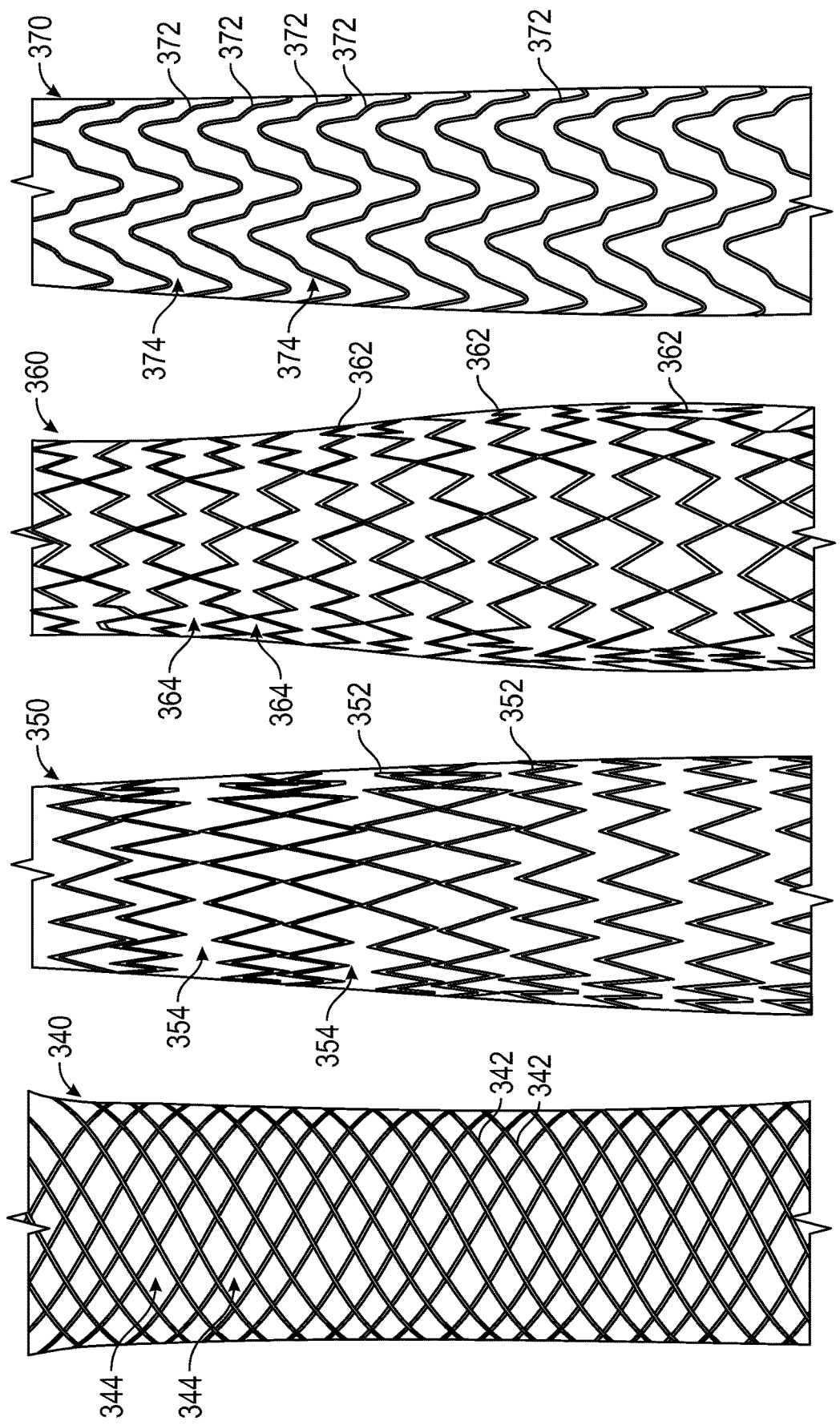

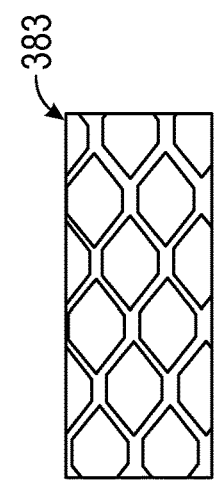
FIG. 11C
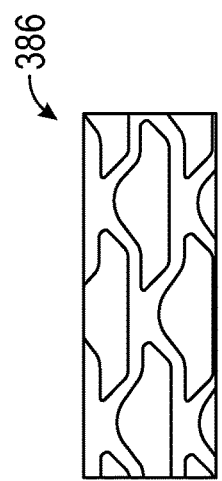
FIG. 11F
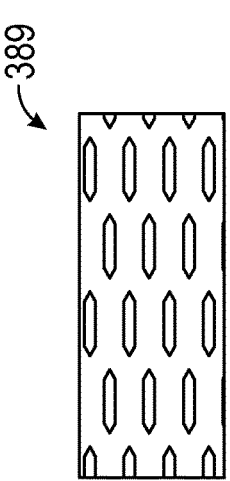
FIG. 11I
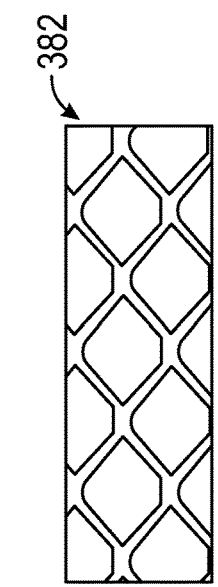
FIG. 11B
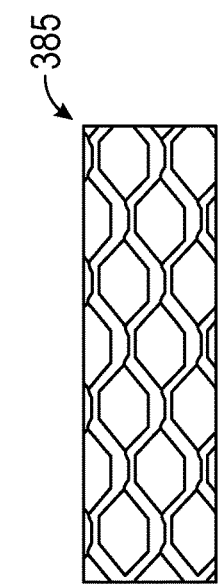
FIG. 11E
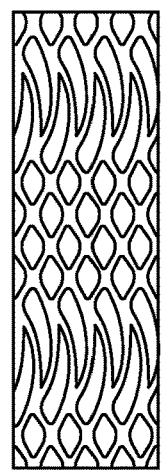
FIG. 11H
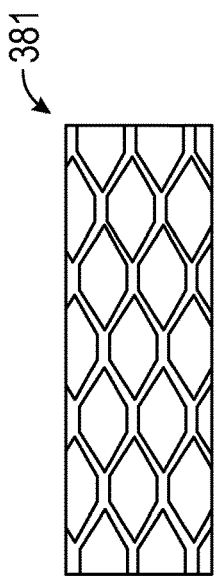
FIG. 11A
FIG. 11D
FIG. 11G

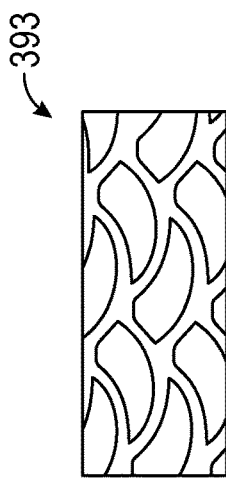
FIG. 11L
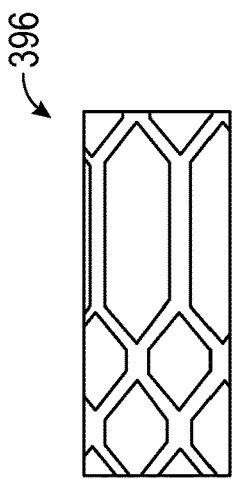
FIG. 11O
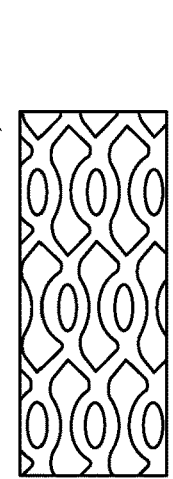
FIG. 11R
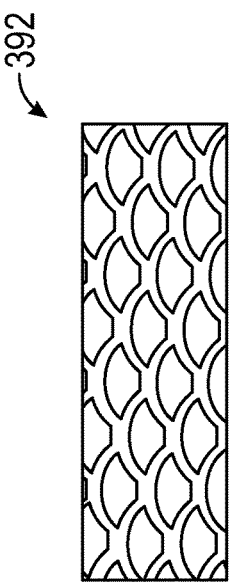
FIG. 11K
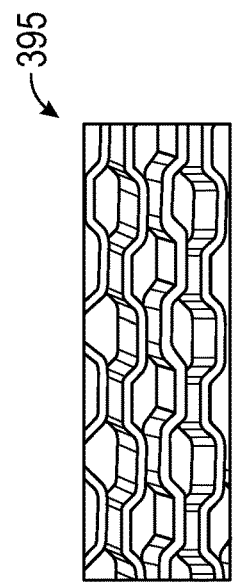
FIG. 11N
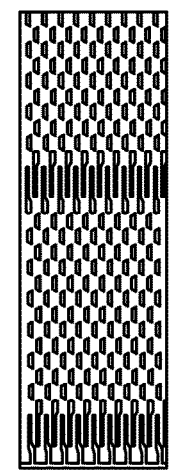
FIG. 11Q
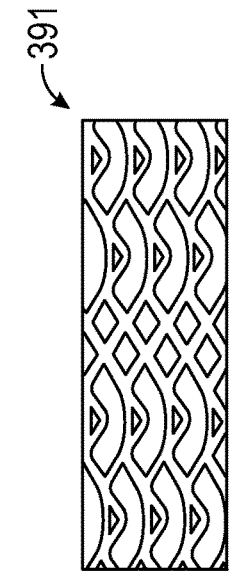
FIG. 11J
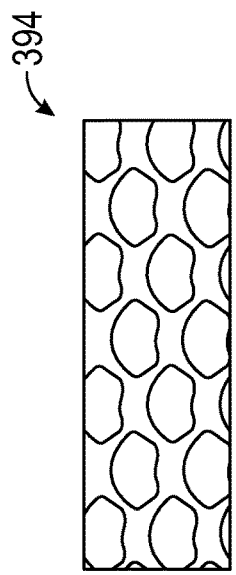
FIG. 11M
FIG. 11P

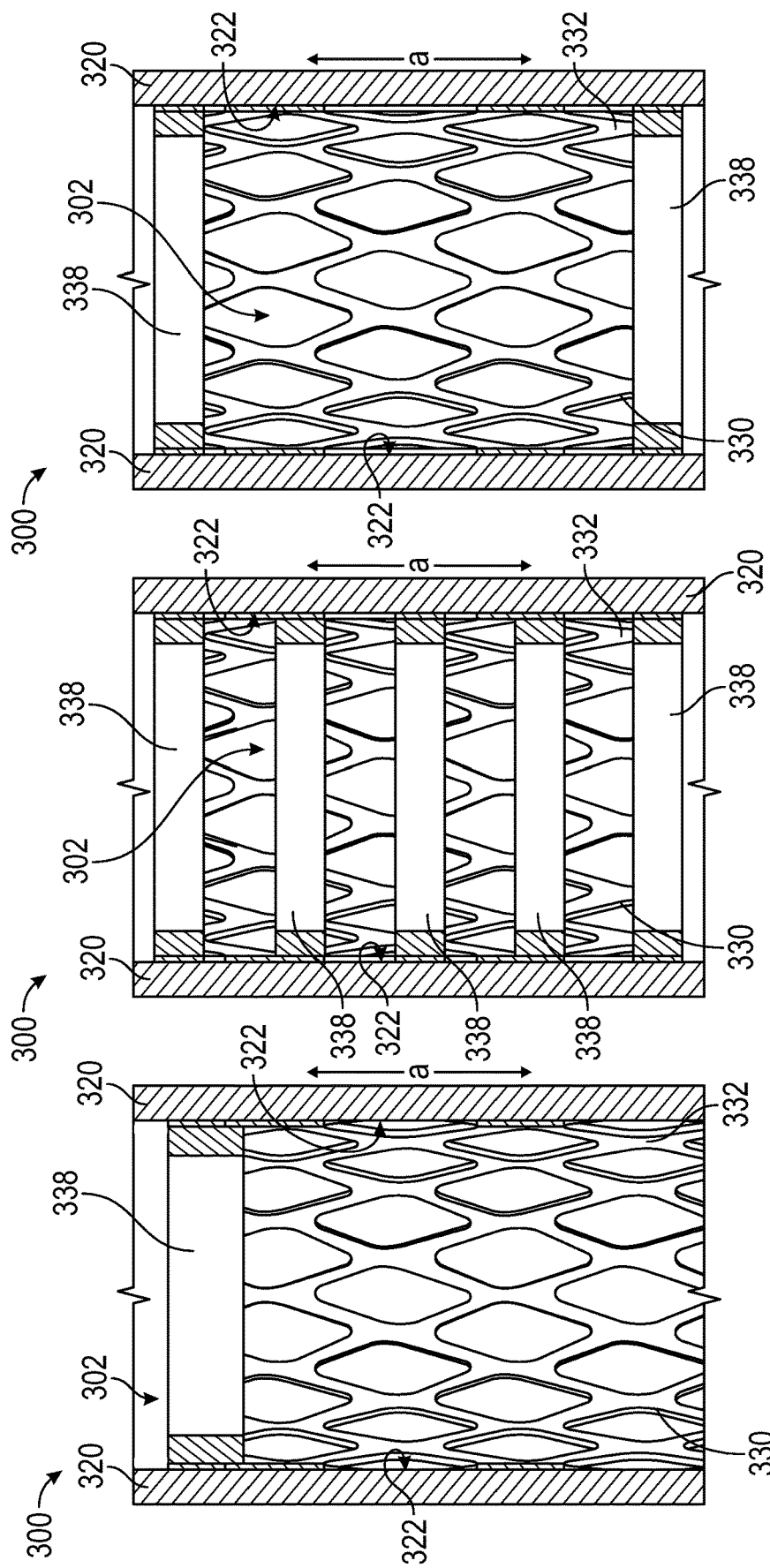

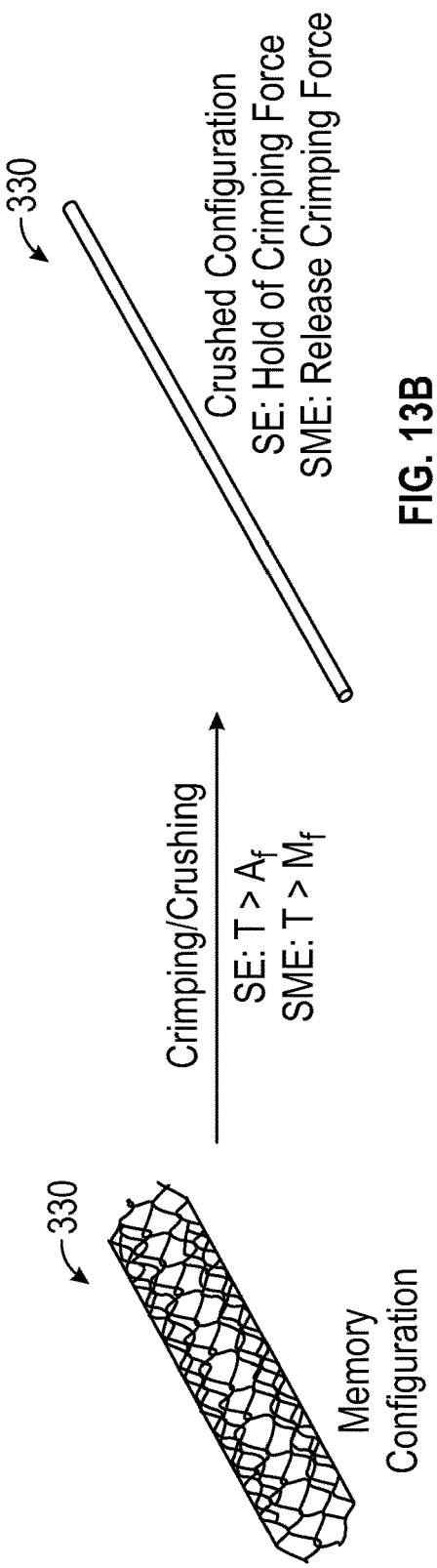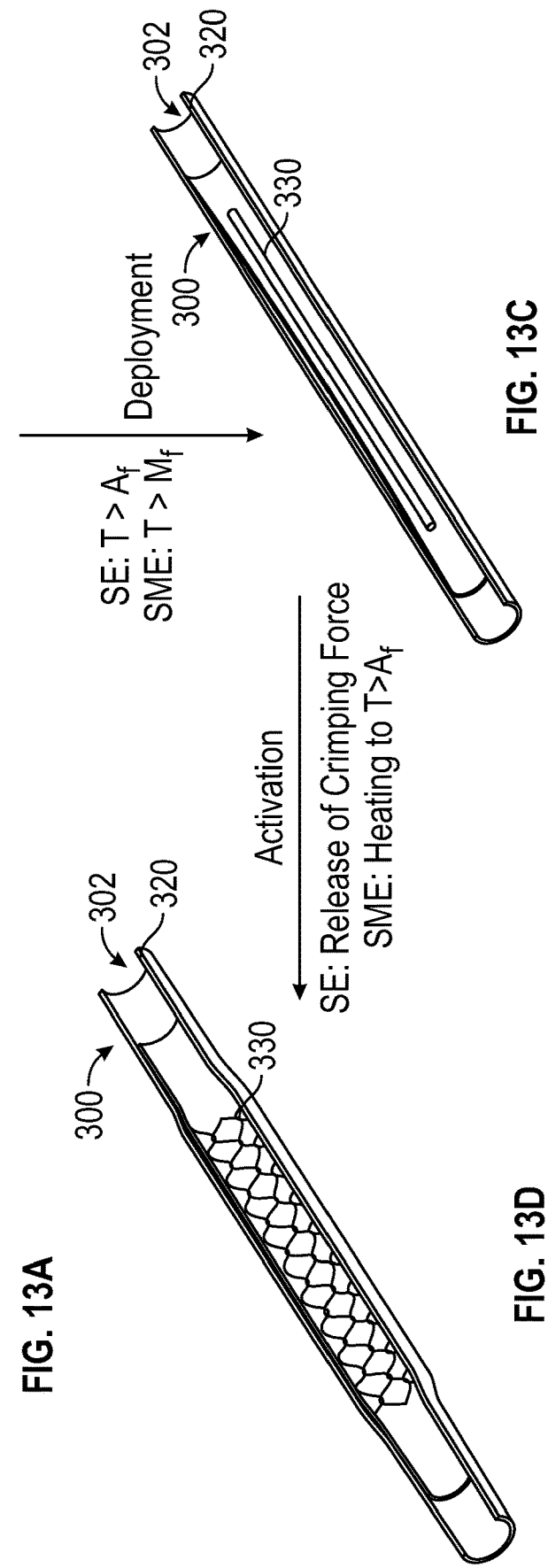
FIG. 13A
FIG. 13B
FIG. 13C
FIG. 13D

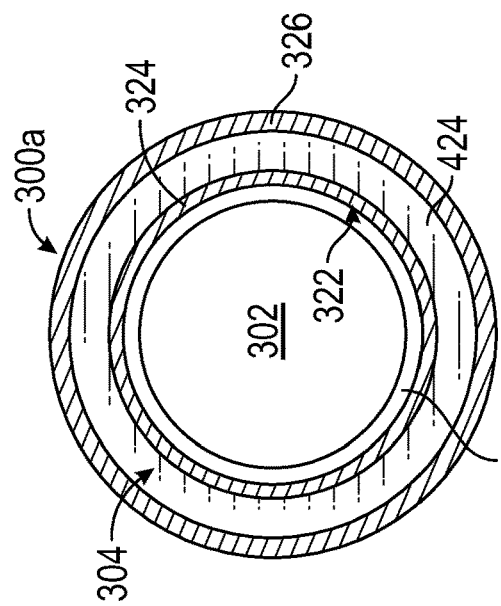
FIG. 19
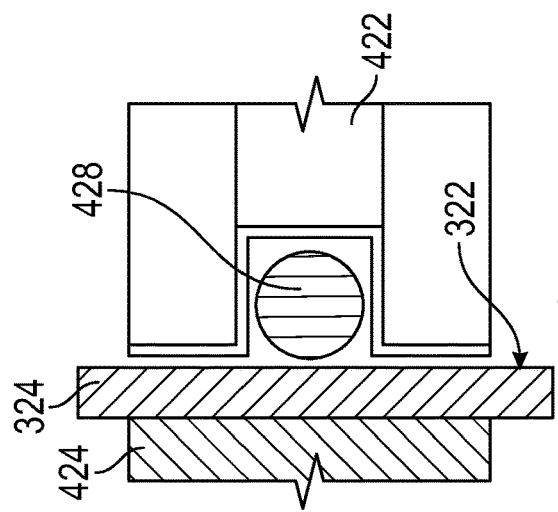
FIG. 20
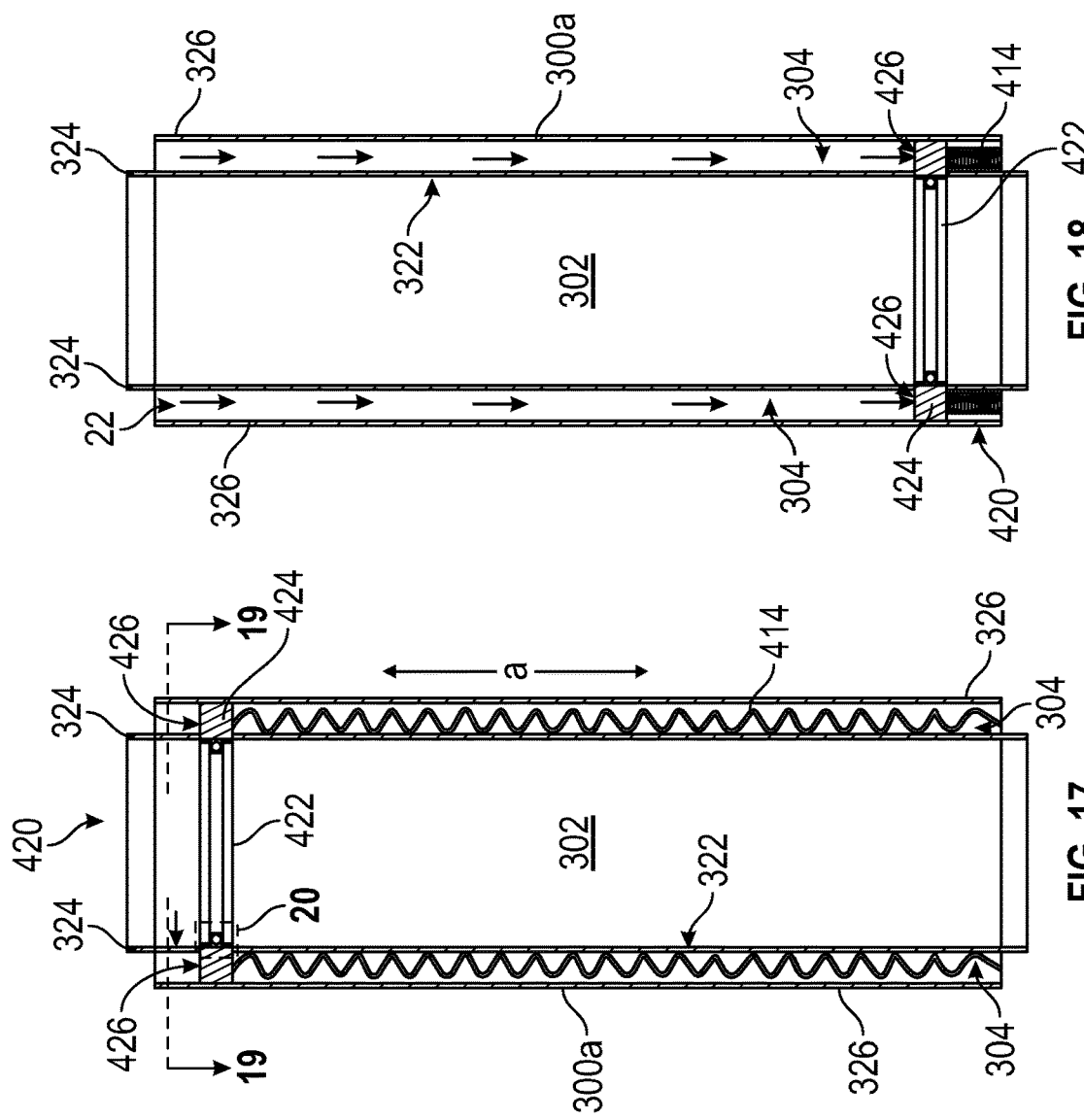
FIG. 18
FIG. 17

SELF-CLEANING CONDUITS FOR HYDROCARBON FLUIDS

CROSS REFERENCE TO RELATED APPLICATIONS

The present application claims the benefit of Indian Patent Application No. 202211037978, filed on Jul. 1, 2022, which is hereby incorporated by reference herein in its entirety.

TECHNICAL FIELD

The present disclosure relates to conduits carrying a hydrocarbon fluid, particularly, conduits in gas turbine engines for aircraft.

BACKGROUND

Gas turbine engines use hydrocarbon fluids, such as fuels and lubricating oils. Such hydrocarbon fluids are conveyed through the engine in various conduits, and the interior surfaces of these conduits contact the hydrocarbon fluids. Carbonaceous deposits (also known as coke) may form on these surfaces when exposed to the hydrocarbon fluids at elevated temperatures, resulting in carbon becoming attached to these surfaces and building up as deposits on these surfaces.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIGS. 10A, 10B, 10C, and 10D show different patterns of a mesh of the mesh sleeve.

FIGS. 11A to 11R show additional patterns of a mesh of the mesh sleeve.

FIGS. 12A, 12B, and 12C are cross-sectional views, taken along line 9-9 in FIG. 7, of the oil tube showing different attachments of the mesh sleeve.

FIGS. 13A to 13D show a process of installing the mesh sleeve into the oil tube. FIG. 13A shows a memory configuration of the mesh sleeve. FIG. 13B shows a compressed configuration of the mesh sleeve. FIG. 13C shows the mesh sleeve being inserted into the oil tube in the compressed configuration. FIG. 13D shows the mesh sleeve in an expanded (installed) configuration within the oil tube.

FIG. 14 shows the oil tube when oil is not flowing through the oil tube, such as in a shutdown condition.

FIG. 15 shows the oil tube when oil is flowing through the oil tube, such as when the engine is operating.

FIG. 17 is a cross-sectional view of an oil tube according to another embodiment. FIG. 17 shows the oil tube when the engine is shut down.

FIG. 18 is a cross-sectional view of the oil tube shown in FIG. 17. FIG. 18 shows the oil tube when the engine is operating.

FIG. 19 is a cross-sectional view, taken along line 19-19 in FIG. 17, of the oil tube shown in FIG. 17.

FIG. 20 is a detail, cross-sectional view, showing detail 20 in FIG. 17, of a movable sleeve assembly.

FIG. 21 shows the oil tube when the engine is shut down.

FIG. 22 shows the oil tube when the engine is operating.

FIG. 24 shows the oil tube when the engine is shut down.

FIG. 25 shows the oil tube when the engine is operating.

DETAILED DESCRIPTION

Figure 1:
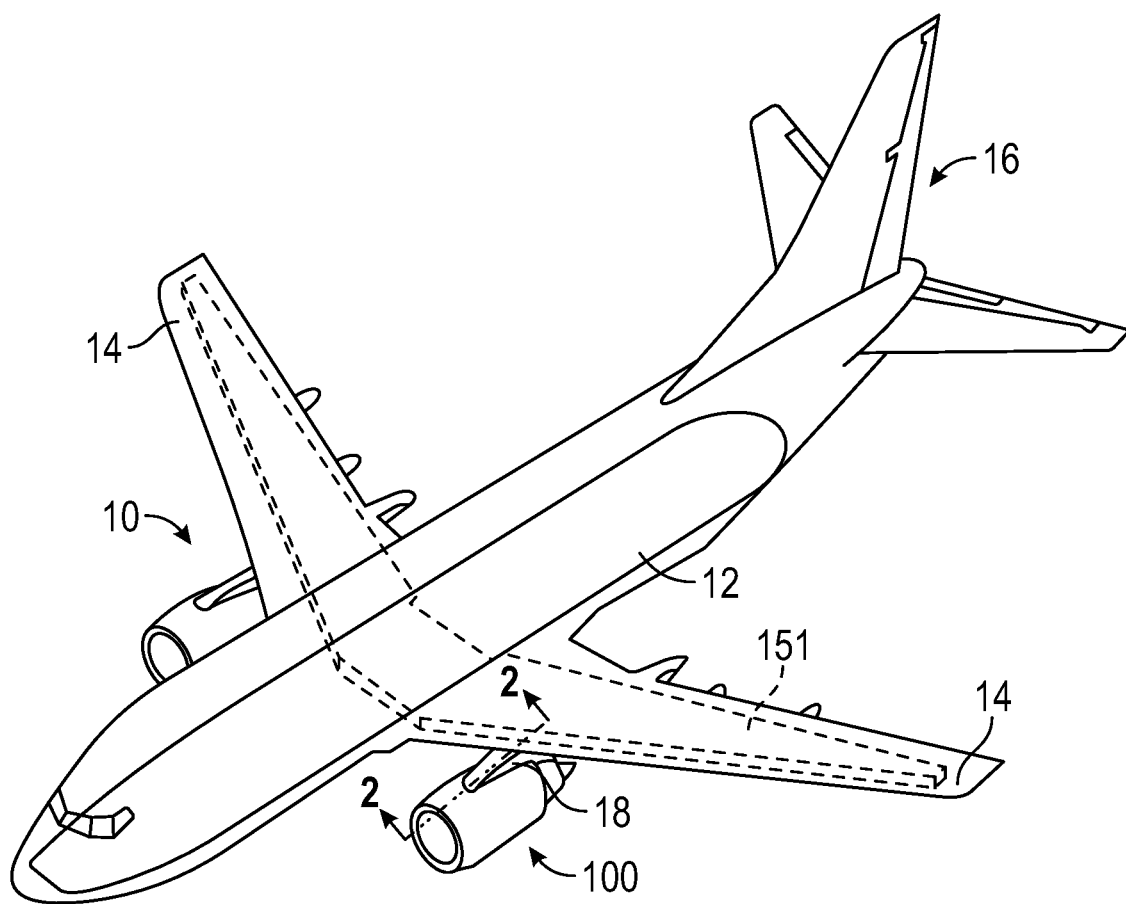
FIG. 1 is a schematic perspective view of an aircraft having a gas turbine engine.

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Here and throughout the specification and the claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, coke deposition may occur on surfaces of a gas turbine engine that are exposed to hydrocarbon fluids, such as fuels and lubricating oils, at elevated temperatures. The hydrocarbon fluids flow through various conduits including, for example, tubes, and the inner walls of such conduits are exposed to these hydrocarbon fluids. On such surfaces, coke can build up in considerable thickness, restricting or even blocking the fluid flow in such passages. In other situations, large pieces of coke can shed off these surfaces causing blockages or even damage to downstream components. In some components, these deposits can be removed by periodic maintenance, such as cleaning or replacement of the component. Such maintenance, however, can be expensive and time consuming, and there may be some components where such maintenance is not possible.

Tubes that may be particularly susceptible to such coking are oil tubes located in fairings of engine frames that support the gas turbine engine and, more specifically, a high-pressure shaft and a low-pressure shaft of the gas turbine engine. Oil is used to lubricate various components of the gas turbine engine including, for example, the bearings supporting the high-pressure shaft and the low-pressure shaft. To provide oil to these bearings, the oil flows through the oil tubes located in the engine frames. A portion of these oil tubes is located within the core air flow path of the gas turbine engine, and these portions of the tubes may be subjected to elevated temperature suitable for coke formation, particularly after shutdown during, so-called, soakback conditions. These oil tubes may be relatively narrow and, as a result of coke formation, may be susceptible to blockages forming in these oil tubes.

The embodiments discussed herein include hydrocarbon fluid conduits, such as an oil tube, that are self-cleaning. Some embodiments employ a mesh sleeve formed of a shape memory alloy (SMA) or bimetallic materials located along the interior surfaces of the hydrocarbon fluid conduit. When the hydrocarbon fluid conduit (oil tube) undergoes the thermal cycling that occurs during normal operation of the gas turbine engine, the mesh sleeve is configured to change in length, breaking up the deposits that have formed on the interior surface of the hydrocarbon fluid conduit. In other embodiments, a sleeve is moved along the interior surface of the hydrocarbon fluid conduit by changes in temperature (like the thermal cycling discussed above) or pressure that occurs in the oil tube during normal operation of the gas turbine engine. Movement of the sleeve breaks ups (or scrapes off) the deposits that have formed on the interior surface of the hydrocarbon fluid conduit. The disrupted coke deposits can then be removed by the natural flow of the hydrocarbon fluid (e.g., oil) past the surface, thus, avoiding the buildup of coke deposits. This is referred to herein as a self-cleaning effect.

The hydrocarbon fluid conduit including the mesh sleeve or movable sleeve discussed herein is particularly suitable for use in engines, such as a gas turbine engine used on an aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 150 (see FIG. 2). An aviation turbine fuel in the embodiments discussed herein is a combustible hydrocarbon liquid fuel, such as a kerosene-type fuel, having a desired carbon number, a synthetic aviation fuel, a biofuel, a biodiesel, an ethanol, a bioalcohol, and the like. The fuel is stored in a fuel tank 151 of the fuel system 150. As shown in FIG. 1, at least a portion of the fuel tank 151 is located in each wing 14 and a portion of the fuel tank 151 is located in the fuselage 12 between the wings 14. The fuel tank 151, however, may be located at other suitable locations in the fuselage 12 or the wing 14. The fuel tank 151 may also be located entirely within the fuselage 12 or the wing 14. The fuel tank 151 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft, including, for example, helicopters and unmanned aerial vehicles (UAV). Further, although not depicted herein, in other embodiments, the gas turbine engine may be any other suitable type of gas turbine engine, such as an industrial gas turbine engine incorporated into a power generation system, a nautical gas turbine engine, etc.

Figure 2:
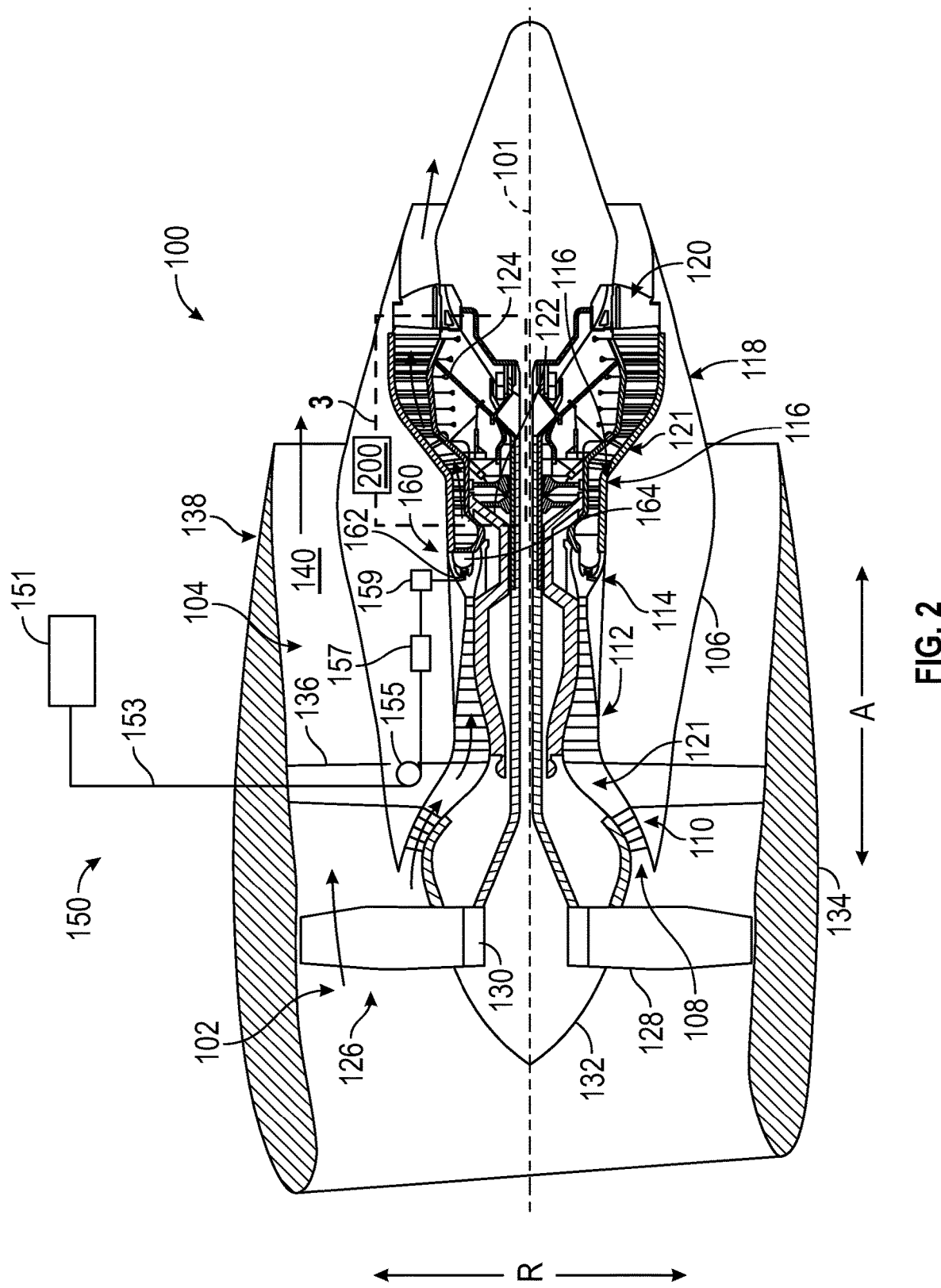
FIG. 2 is a schematic, cross-sectional view, taken along line 2-2 in FIG. 1, of one of the gas turbine engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. For the embodiment depicted in FIG. 2, the engine 100 is a high bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the longitudinal centerline 101 (the axial direction A). The turbofan engine 100 includes a fan section 102 and a turbomachine 104 disposed downstream from the fan section 102.

The turbomachine 104 depicted in FIG. 2 includes a tubular outer casing 106 (also referred to as a housing or a nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flow path 121 extending from the inlet 108 to the jet exhaust nozzle section 120. The turbofan engine 100 further includes one or more drive shafts. More specifically, the turbofan engine 100 includes a high-pressure (HP) shaft or a spool 122 drivingly connecting the HP turbine 116 to the HP compressor 112, and a low-pressure (LP) shaft or a spool 124 drivingly connecting the LP turbine 118 to the LP compressor 110.

The fan section 102 shown in FIG. 2 includes a fan 126 having a plurality of fan blades 128 coupled to a disk 130. The fan blades 128 and the disk 130 are rotatable, together, about the longitudinal centerline (axis) 101 by the LP shaft 124. The LP compressor 110 may also be directly driven by the LP shaft 124, as depicted in FIG. 2. The disk 130 is covered by a rotatable front hub 132 that is aerodynamically contoured to promote an airflow through the plurality of fan blades 128. Further, an annular fan casing or an outer nacelle 134 circumferentially surrounds the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 150 and receives a flow of fuel from the fuel system 150. The fuel system 150 includes a fuel delivery assembly 153 providing the fuel flow from the fuel tank 151 to the turbofan engine 100, and, more specifically, to a plurality of fuel nozzles 162 that inject fuel into a combustion chamber 164 of a combustor 160 of the combustion section 114. The components of the fuel system 150, and, more specifically, the fuel tank 151, is an example of a fuel source that provides fuel to the fuel nozzles 162, as discussed in more detail below. The fuel delivery assembly 153 includes tubes, pipes, conduits, and the like, to fluidly connect the various components of the fuel system 150 to the engine 100. The fuel tank 151 is configured to store the hydrocarbon fuel, and the hydrocarbon fuel is supplied from the fuel tank 151 to the fuel delivery assembly 153. The fuel delivery assembly 153 is configured to carry the hydrocarbon fuel between the fuel tank 151 and the engine 100 and, thus, provides a flow path (fluid pathway) of the hydrocarbon fuel from the fuel tank 151 to the engine 100.

The fuel system 150 includes at least one fuel pump fluidly connected to the fuel delivery assembly 153 to induce the flow of the fuel through the fuel delivery assembly 153 to the engine 100. One such pump is a main fuel pump 155. The main fuel pump 155 is a high-pressure pump that is the primary source of pressure rise in the fuel delivery assembly 153 between the fuel tank 151 and the engine 100. The main fuel pump 155 may be configured to increase a pressure in the fuel delivery assembly 153 to a pressure greater than a pressure within the combustion chamber 164 of the combustor 160.

The fuel system 150 also includes a fuel metering unit 157 in fluid communication with the fuel delivery assembly 153. Any suitable fuel metering unit 157 may be used including, for example, a metering valve. The fuel metering unit 157 is positioned downstream of the main fuel pump 155 and upstream of a fuel manifold 159 configured to distribute fuel to the fuel nozzles 162. The fuel system 150 is configured to provide the fuel to the fuel metering unit 157, and the fuel metering unit 157 is configured to receive fuel from the fuel tank 151. The fuel metering unit 157 is further configured to provide a flow of fuel to the engine 100 in a desired manner. More specifically, the fuel metering unit 157 is configured to meter the fuel and to provide a desired volume of fuel, at, for example, a desired flow rate, to the fuel manifold 159 of the engine 100. The fuel manifold 159 is fluidly connected to the fuel nozzles 162 and distributes (provides) the fuel received to the plurality of fuel nozzles 162, where the fuel is injected into the combustion chamber 164 and combusted. Adjusting the fuel metering unit 157 changes the volume of fuel provided to the combustion chamber 164 and, thus, changes the amount of propulsive thrust produced by the engine 100 to propel the aircraft 10.

Figure 3:
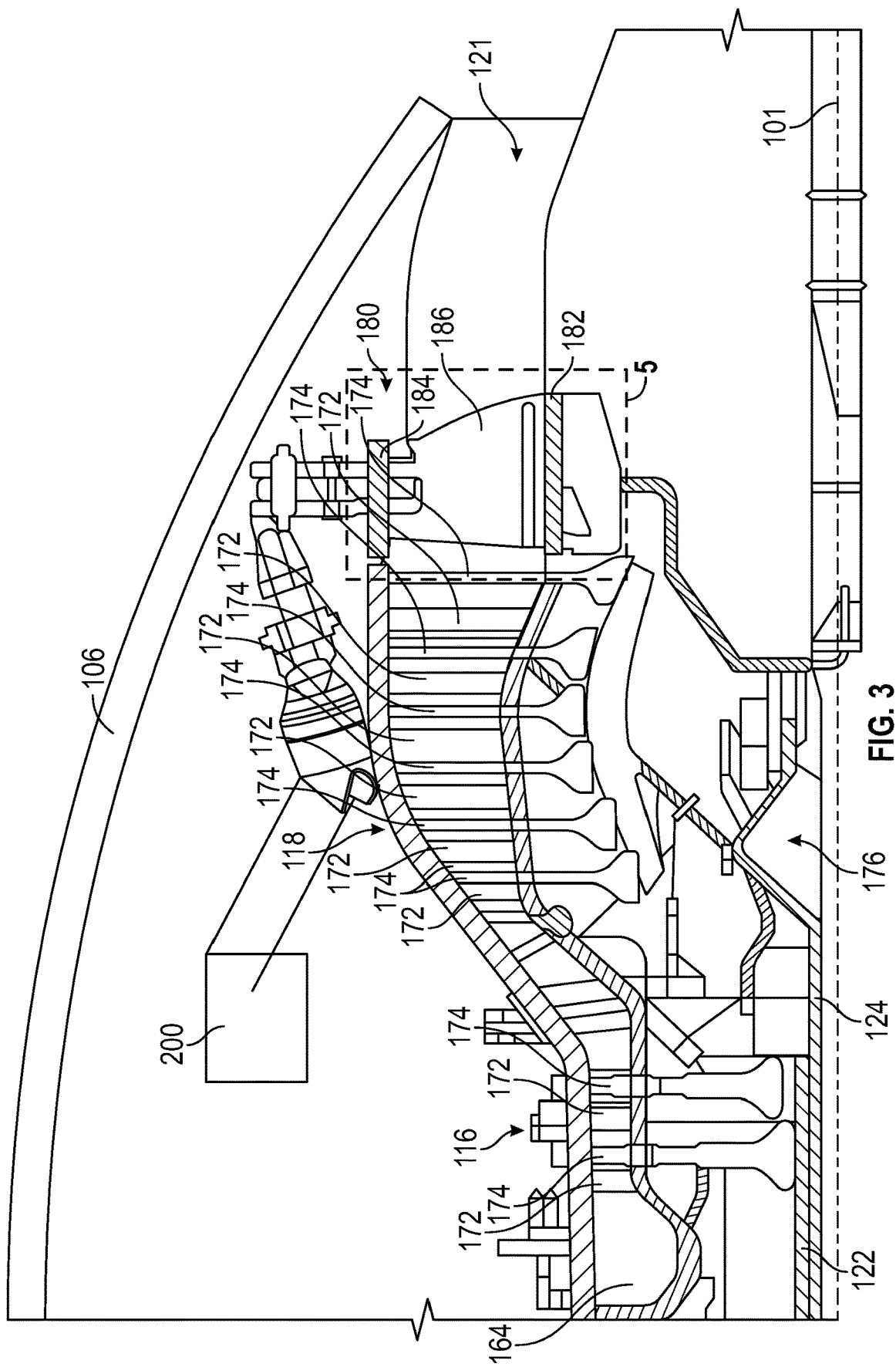
FIG. 3 is a detail, cross-sectional view of the turbine of the gas turbine engine, showing detail 3 in FIG. 2.

FIG. 3 is a detail, cross-sectional view of the turbine section. FIG. 3 shows detail 3 in FIG. 2. The compressor section and, more specifically, the LP compressor 110 and the HP compressor 112 (see FIG. 2), provides compressed air to the combustion chamber 164 where the compressed air is mixed with the fuel and combusted to generate hot combustion gases (combustion products). Each of the LP compressor 110 and the HP compressor 112 includes at least one rotor, such as a compressor blades connected to a hub, for example. The combustion gases are discharged to the turbine section and, more specifically, the HP turbine 116 and the LP turbine 118. The HP turbine 116 may include alternating rows of stationary vanes 172 (or nozzles) and rotating turbine blades 174 (or buckets). The combustion gases expand in the HP turbine 116 and the expanding combustion gases rotate (drive) the turbine blades 174. The turbine blades 174 of the HP turbine 116 are connected to the HP shaft 122 and, thus, drive the HP compressor 112 through the HP shaft 122. The LP turbine 118 also may include alternating rows of stationary vanes 172 and rotating turbine blades 174. The combustion gases further expand in the LP turbine 118 and the expanding combustion gases rotate (drive) the turbine blades 174. The turbine blades 174 of the LP turbine 118 are connected to the LP shaft 124 and, thus, drive the LP compressor 110 and fan 126 through the LP shaft 124.

The HP shaft 122 and the LP shaft 124 are supported for rotation in one or more bearings 176. One or more turbine frames 180 provide structural load paths from the bearings 176 to the outer casing 106, which forms a backbone structure of the engine 100. The turbine frame shown in FIG. 3 is a turbine rear frame 180. The engine 100 may also include other frames, not shown, such as a front frame forward of the HP compressor 112 and a turbine central frame. The following discussion focuses on the turbine rear frame 180 but also applies to the other frames of the engine 100.

The turbine rear frame 180 comprises an annular, centrally-located hub 182, surrounded by an annular outer ring 184. The hub 182 and the outer ring 184 are interconnected by a plurality of radially-extending struts (not shown). The turbine rear frame 180 may have, for example, six equally-spaced struts around the circumferential direction. The turbine rear frame 180 may be a single integral unit or may be built up from individual components. The struts may be hollow and include a bleed-air port for cooling of the struts. The turbine rear frame 180 may also include a plurality of service tube assemblies 186 mounted in the turbine rear frame 180. The service tube assemblies 186 may be positioned between the struts, and extend between the hub 182 and the outer ring 184. In this example, six service tube assemblies 186 are circumferentially spaced between each of the struts. As will be discussed in more detail below, each service tube assembly 186 includes a hollow service tube that may be used to convey a fluid to and from the inner core of the engine 100. The service tubes may be the hydrocarbon fluid conduits according to embodiments discussed herein and, in the particular embodiment discussed below, the service tube is an oil tube 300 (see FIG. 5) of a main lubrication system 200 (see FIG. 4).

Figure 4:
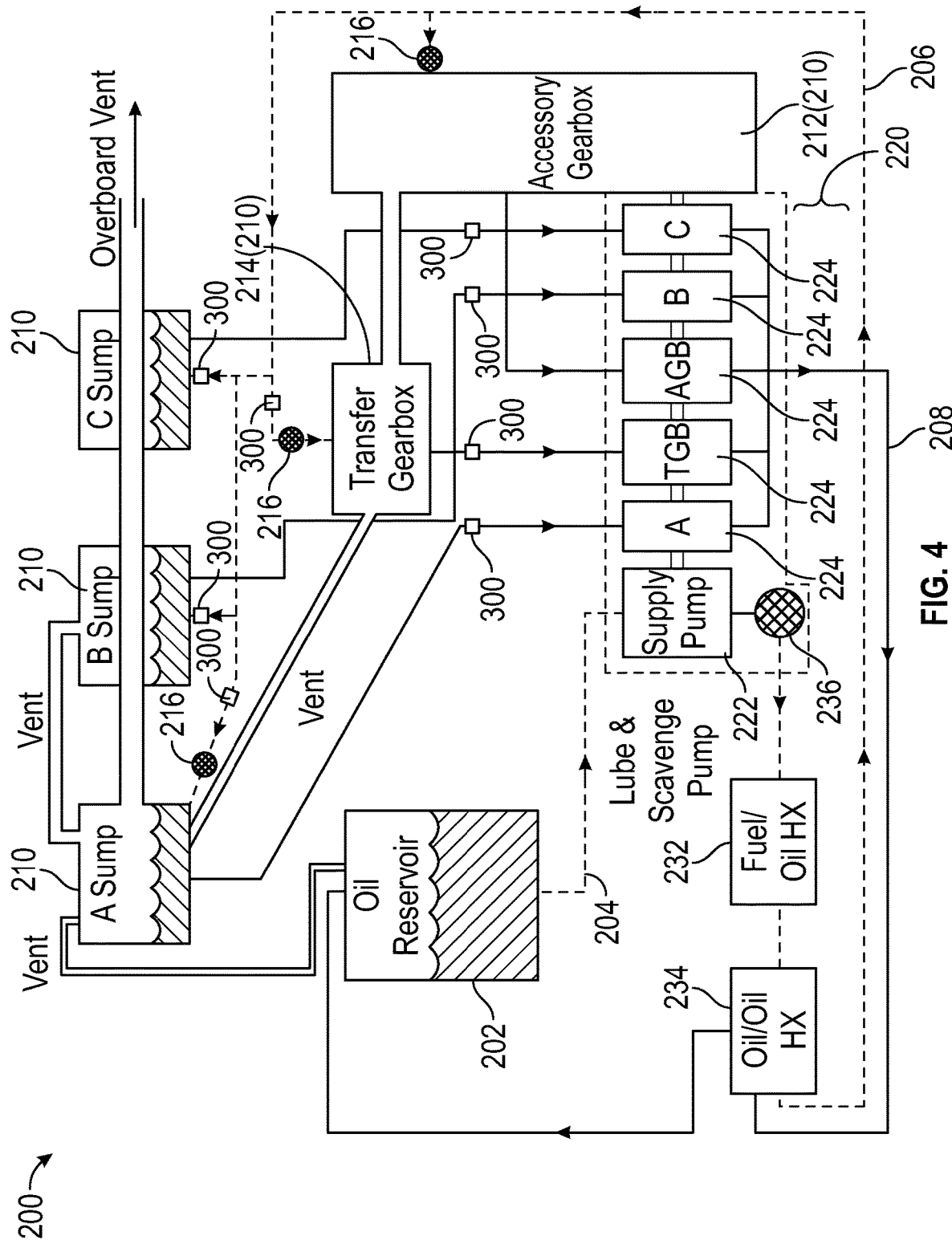
FIG. 4 is a schematic view of an oil system of the gas turbine engine shown in FIG. 2.

FIG. 4 is a schematic of the main lubrication system 200 of the engine 100. The main lubrication system 200 includes an oil reservoir 202 configured to store the oil. The main lubrication system 200 also includes an oil delivery assembly 204. The oil delivery assembly 204 is fluidly connected to the oil reservoir 202 and configured to distribute oil to the components of the main lubrication system 200 including various sumps 210 within the engine 100. The oil delivery assembly 204 includes tubes, pipes, conduits, and the like, to fluidly connect the various components of the main lubrication system 200. The oil delivery assembly 204 is configured to carry the oil between the oil reservoir 202 and the various sumps 210 within the engine 100 (see FIG. 2) and, thus, provides a flow path (fluid pathway) of the oil between the oil reservoir 202 and one or more sumps 210. The oil delivery assembly 204 includes, for example, supply lines 206 that are configured to supply the oil from the oil reservoir 202 to each sump 210 and scavenge lines 208 that are configured to provide a flow path for the oil from each sump 210 back to the oil reservoir 202. The supply lines 206 are shown with broken lines in FIG. 4, and the scavenge lines 208 are shown with solid lines in FIG. 4.

The sumps 210 (depicted as A sump, B sump, or C sump, in FIG. 4) may be any component of the engine 100 requiring lubrication including, for example, the bearing 176. Other sumps 210 include, for example, an accessory gearbox 212 or a transfer gearbox 214. The accessory gearbox 212 may be configured to transfer power from the main drive train of the engine 100 to various accessory systems of the engine 100 or the aircraft 10. The transfer gearbox 214 (also referred to as a reduction gearbox or a power gearbox) may be used in the drive train of the engine 100 to transfer power and torque from the turbomachine 104 to the fan section 102 (see FIG. 2). In some embodiments, the disk 130 (see FIG. 2) is connected to a fan shaft and the fan shaft is coupled to the LP shaft 124 (see FIG. 2) by the transfer gearbox 214, and the LP shaft 124 drives (rotates) the fan shaft by transferring power and torque through the transfer gearbox 214.

Some of the sumps 210 of the engine 100 are located radially within the core air flow path 121, such as, for example, the bearing 176 (see FIG. 3) and the transfer gearbox 214. To provide the oil to and remove oil from these sumps 210, the oil passes through the core air flow path 121. A portion of the oil delivery assembly 204, thus, includes the oil tube 300 of the service tube assembly 186 (see FIG. 5). As will be discussed further below, the oil tube 300 may be self-cleaning to remove coke that may build up within the oil tube 300. Accordingly, the main lubrication system 200 may also include a plurality of filters 216 located within various oil lines of the oil delivery assembly 204. The filter 216 is sized and positioned within the oil delivery assembly 204 to collect coke particles that may be dislodged from the oil tube 300 and before such particles enter portions of the main lubrication system 200 where they could cause clogging, such as oil nozzles providing oil to portions of the bearing 176 or the transfer gearbox 214.

The main lubrication system 200 includes at least one oil pump 220 fluidly connected to the oil delivery assembly 204 to induce the flow of oil through the oil delivery assembly 204. The main lubrication system 200 may include, for example, a supply pump 222 configured to draw oil from the oil reservoir 202 and to supply the oil to each sump 210. The supply pump 222 may be positioned downstream of the oil reservoir 202 and upstream of the sumps 210 relative to the flow of the oil within the oil delivery assembly 204. The main lubrication system 200 may also include a plurality of scavenge pumps 224 configured to scavenge (draw) the oil from each of the sumps 210 and to return the scavenged oil back to the oil reservoir 202. One scavenge pump 224 may be used for each sump 210, and each of the scavenge pumps 224 may be positioned downstream of the corresponding sump 210 and upstream of the oil reservoir 202 relative to the flow of the oil within the oil delivery assembly 204. The oil pumps 220 may be driven by the accessory gearbox 212.

The main lubrication system 200 may also include at least one heat exchanger configured to extract heat from the oil. In this embodiment, the main lubrication system 200 includes a fuel-to-oil heat exchanger 232 and an oil-to-oil heat exchanger 234. In this embodiment, the fuel-to-oil heat exchanger 232 and the oil-to-oil heat exchanger 234 are positioned downstream of the supply pump 222 and upstream of the sumps 210 relative to the flow of the oil within the oil delivery assembly 204. A main filter 236 may be positioned between the supply pump 222 and the fuel-to-oil heat exchanger 232 and/or the oil-to-oil heat exchanger 234 to remove any debris from the oil prior to the oil flowing to the fuel-to-oil heat exchanger 232, the oil-to-oil heat exchanger 234, and the sumps 210.

Figure 5:
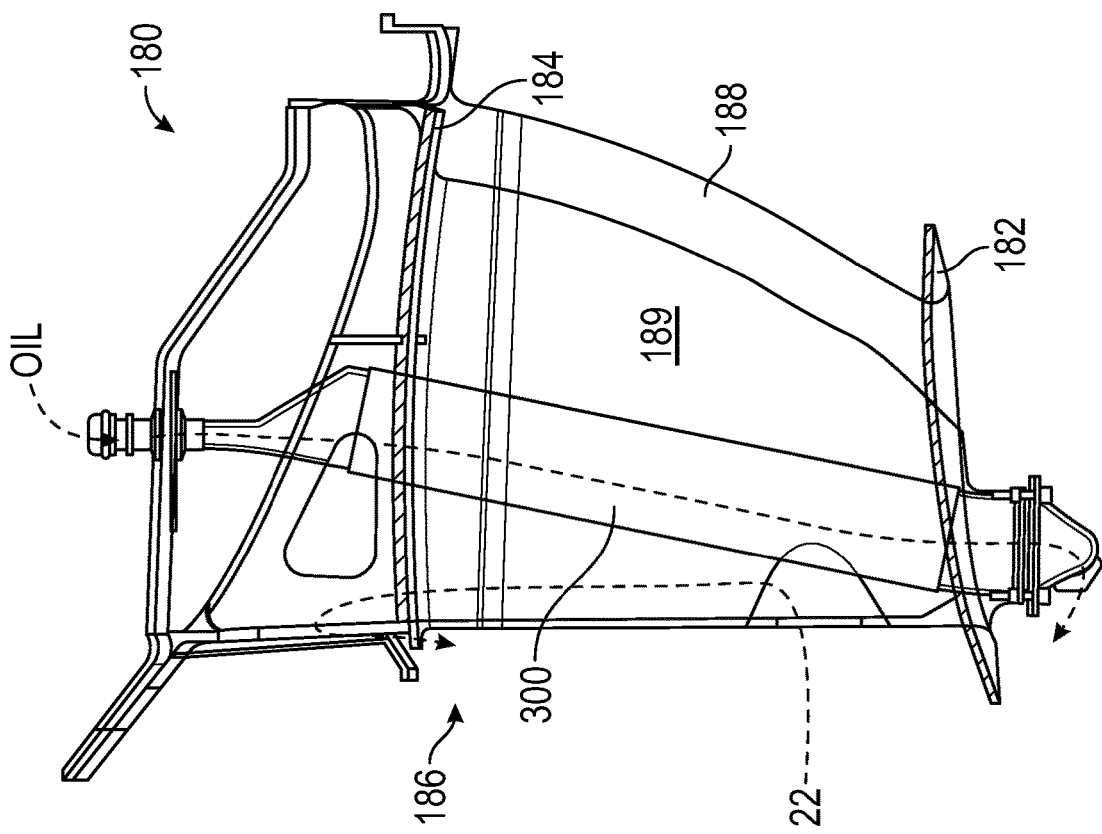
FIG. 5 is a detail, cross-sectional view, showing detail 5 of FIG. 3, of a service tube assembly of a turbine rear frame.

FIG. 5 is a detail, cross-sectional view, showing detail 5 of FIG. 3, of the service tube assembly 186 of the turbine rear frame 180. The service tube assembly 186 may include a service tube fairing 188. The service tube fairing 188 of this embodiment is an airfoil-shaped vane that is supported between the hub 182 and the outer ring 184. The service tube fairing 188 is hollow having a cavity 189, and the oil tube 300 is located within the cavity 189 of the service tube fairing 188. The service tube fairing 188 may include a plurality of holes and compressor bleed air 22 from the compressor section may be supplied to the cavity 189 and expelled outwardly through the holes to cool the service tube fairing 188 when the engine 100 is operating.

Figure 6:
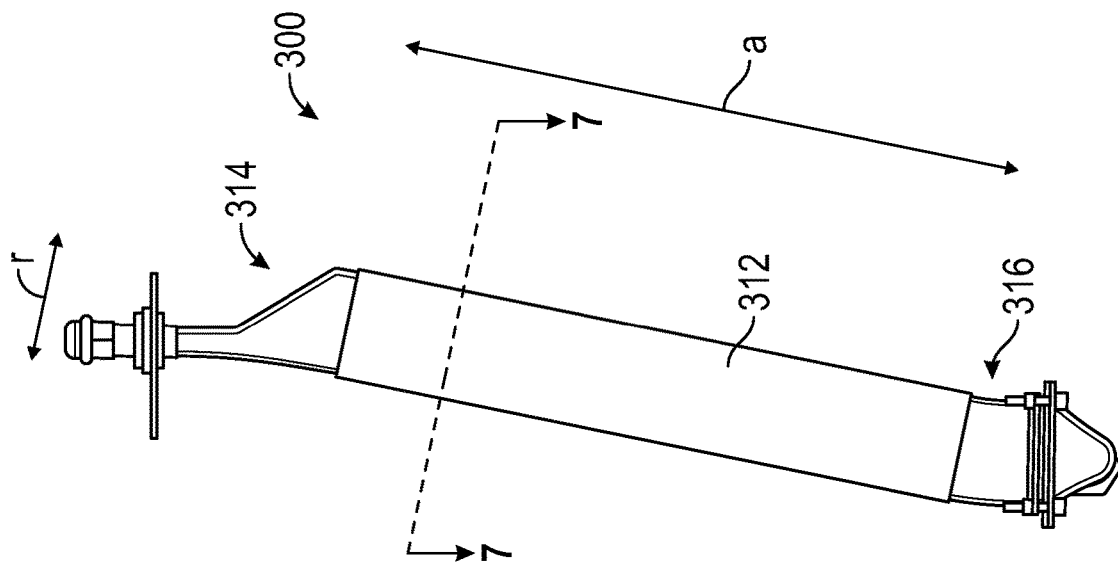
FIG. 6 shows an oil tube of the service tube assembly shown in FIG. 5.
Figure 7:
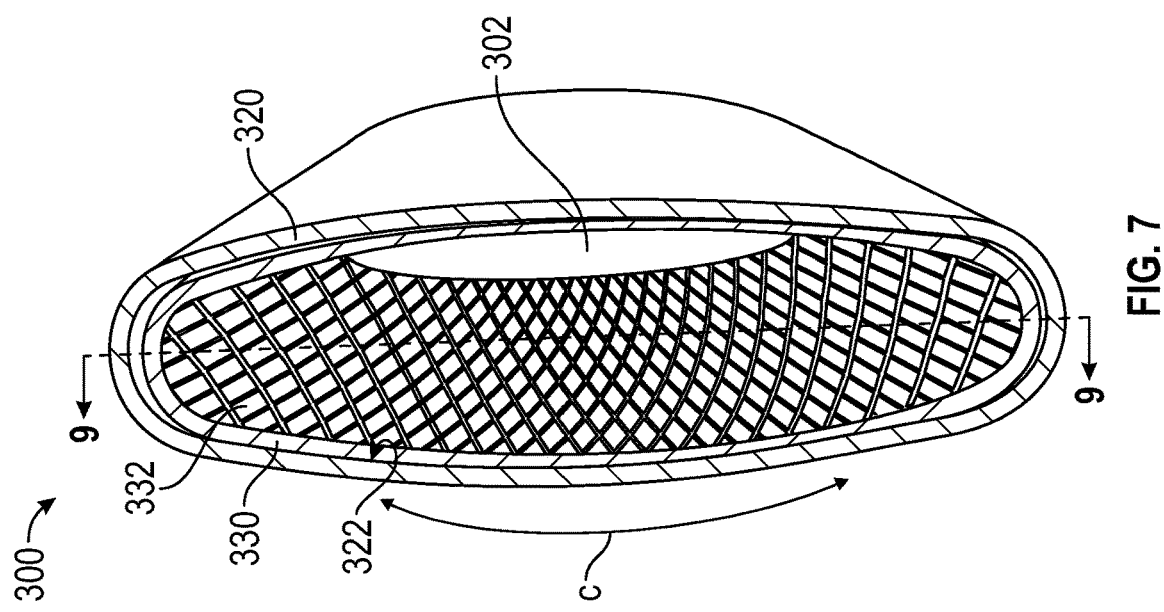
FIG. 7 is a cross-sectional view, taken along line 7-7 in FIG. 6, of the oil tube shown in FIG. 5.

FIG. 6 shows the oil tube 300 of the service tube assembly 186, and FIG. 7 is a cross-sectional view, taken along line 7-7 in FIG. 6, of the oil tube 300. The oil tube 300 has a central section 312 disposed between a reduced-diameter outer end 314 and a reduced-diameter inner end 316. The central section 312 is located within the cavity 189 of the service tube fairing 188 (see FIG. 5). The inner end 316 may include a generally cylindrical male fitting that forms a plug-in connection in cooperation with a female receptacle of one of the sumps 210 (see FIG. 4), such as the bearing 176 located within the turbine rear frame 180 (see FIG. 3). The outer end 314 includes a fitting used to fluidly connect the oil tube 300 with one of the supply line 206 or the scavenge line 208 (see FIG. 4). The oil tube 300 has an axial direction a, a radial direction r, and a circumferential direction c (see FIG. 7). Herein, small case letters are used for the directions relative to the oil tube 300, as opposed to capital letters for the directions relative to the engine 100. The axial direction a of the oil tube 300 extends generally in a radial direction R of the engine 100 (see FIG. 2) and, in this embodiment, the radial direction of the turbine rear frame 180 (see FIG. 5). The circumferential direction extends in a direction rotating about the axial direction a.

As shown in FIG. 7, the oil tube 300 includes a wall 320 having an interior surface 322. The interior surface 322 defines a flow passage 302 for the oil (hydrocarbon fluid). The oil tube 300 and, more specifically, the wall 320 is annular. Although the oil tube 300 may have any suitable shape (e.g., a circular shape), the oil tube 300 and, more specifically, the wall 320 is elliptical, in this embodiment, having a major axis aligned in the axial direction A of the engine 100 (see FIG. 2). The wall 320 may be formed from any of stainless steel, corrosion-resistant alloys of nickel and chromium, and high-strength nickel-base alloys. The wall 320 may be formed from a metal alloy chosen from the group consisting of iron-based alloys, nickel-based alloys, and chromium-based alloys.

Figure 8:
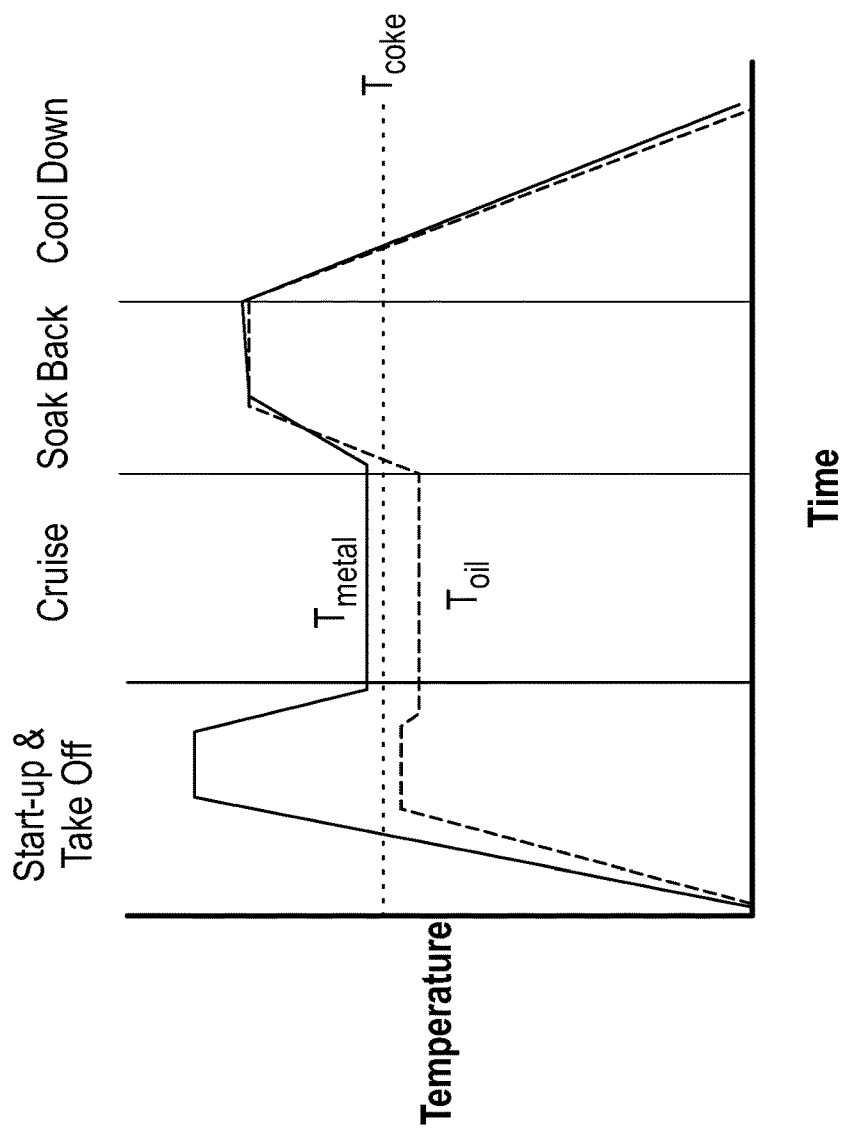
FIG. 8 is a graph showing the temperature of the oil and the temperature of the oil tube through different stages of a flight.

FIG. 8 is a graph showing the temperature of the oil ($T_{oil}$) and the temperature of the wall 320 ($T_{metal}$) through different stages of a flight. The wall 320 and, more specifically, the interior surface 322 (see FIG. 7) may be exposed to elevated temperatures during operation. Such elevated temperatures may include, for example, temperatures greater than three hundred fifty degrees Fahrenheit. As noted above, the oil tube 300 is positioned within the core air flow path 121 and the temperature of the wall 320 thus follows the temperature of the air flowing though the core air flow path 121 (see FIG. 2). As can be seen in FIG. 8, the temperature of the wall 320 ($T_{metal}$) increases from ambient temperatures to a high temperature during start-up and take off and, when the temperature of the air flowing through the core air flow path 121 reduces during cruise, so does the temperature of the wall 320 ($T_{metal}$). Similarly, the temperature of the oil ($T_{oil}$) flowing through the flow passage 302 of the oil tube 300 also increases from ambient temperature to operating temperatures during start-up, take off, and cruise. As the oil is flowing through the oil tube 300, the oil temperature is impacted less by the temperature of the air flowing through the core air flow path 121 than other sources of heat within the engine 100.

Immediately after shutdown, so-called soak back heating occurs. At shutdown, the flow of the oil within the flow passage 302 (see FIG. 7) and against the interior surface 322 (see FIG. 7) is stagnated (or at least greatly reduced). In addition, the compressor bleed air 22 is not flowing to cool the service tube fairing 188 (see FIG. 5) and the wall 320 (see FIG. 7). At the same time, components such as the service tube assembly 186 (see FIG. 5) are still hot. Accordingly, both the temperature of the oil and the wall 320 increase to temperatures above a coke formation temperature ($T_{coke}$). At these temperatures, the interior surface 322, which is exposed to the oil and made from the metals discussed above, may be susceptible to a significant build-up of coke. Under such conditions, coke can build up over time to a considerable thickness, restricting or even blocking the flow of the oil through the flow passage 302. As the components of the engine 100 release their heat to the environment, the oil tube 300 and oil in the oil tube 300 will begin to cool down.

The oil tube 300 discussed herein is self-cleaning and may employ a movable sleeve to remove the coke forming on the interior surface 322 of the wall 320 (see FIG. 7). The movable sleeve of the embodiments discussed herein is passive, utilizing changes in operational conditions of the engine 100, such as temperature and pressure changes, to move the movable sleeve. The movable sleeve may move along the interior surface 322 of the wall 320 breaking up (or scraping off) the coke deposits that have formed on the interior surface 322. The disrupted coke deposits can then be removed by the natural flow of the oil through the flow passage 302 (see FIG. 7), thus, avoiding the buildup of coke deposits. As noted above, this is referred to herein as a self-cleaning effect.

Figure 9:
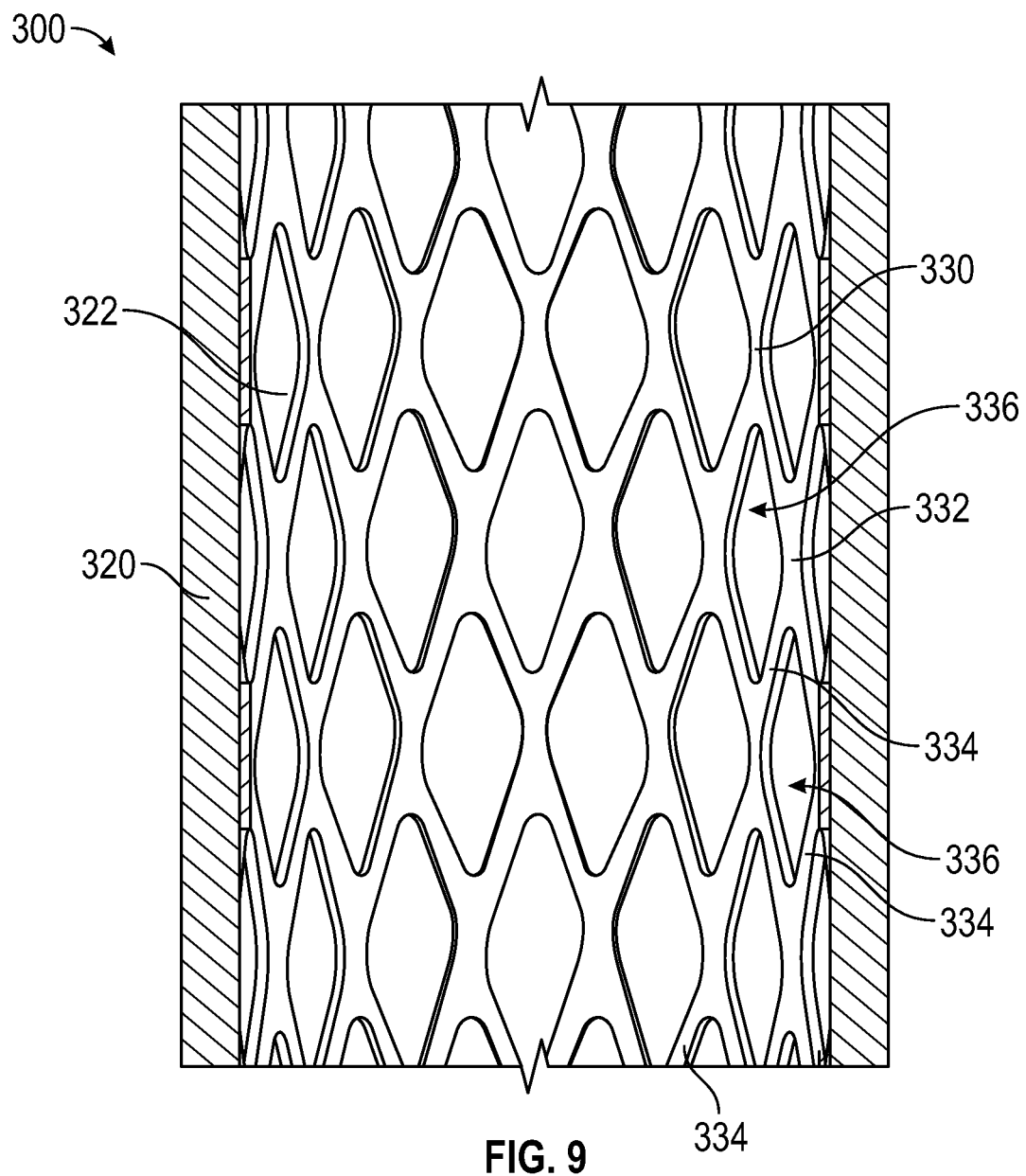
FIG. 9 is a cross-sectional view, taken along line 9-9 in FIG. 7, of the oil tube. A mesh sleeve contained within the tube is not shown in cross section to illustrate the features of the mesh sleeve.

FIG. 9 shows a movable sleeve according to an embodiment. FIG. 9 is a cross-sectional view, taken along line 9-9 in FIG. 7, of the oil tube 300. The movable sleeve of this embodiment is a mesh sleeve 330. The mesh sleeve 330 also is shown in FIG. 7. The mesh sleeve 330 is positioned within the flow passage 302 of the oil tube 300 such that the mesh sleeve 330 abuts the interior surface 322 (see FIG. 7). The mesh sleeve 330 is formed of a mesh 332 made from a shape memory alloy (SMA). The mesh 332 of the mesh sleeve 330 may be formed from one of a plurality of materials generally recognized to fall within the class of "shape memory alloys." In the applications discussed herein, the shape memory alloy is preferably a high-temperature shape memory alloy. One suitable high-temperature shape memory alloy is, for example, a nickel-titanium alloy known under the trade name Nitinol. Other suitable shape memory alloys include, for example, cobalt-nickel-aluminum alloys, nickel-iron-gallium alloys, iron-manganese-gallium alloys, and cobalt-nickel-gallium alloys.

Shape memory alloys may undergo a phase change with changing (an increase or decrease) in temperature. Nitinol®, for example, may change between an austenitic phase and a martensitic phase. The temperature (or temperature range) at which this phase change occurs may be referred to as a transformation temperature. The shape memory alloy used to form the mesh 332 of the oil tube 300 preferably has a transformation temperature range appropriate for the thermal cycling of the oil tube 300, discussed above with respect to FIG. 8, and the oil tube 300 is configured to be exposed to thermal cycling passing through the transformation temperature range of the selected shape memory alloy. Many of the shape memory alloys discussed above, like Nitinol®, can be tuned to have a transformation temperature in the range from room temperature (e.g., twenty degrees Celsius) to one hundred degrees Celsius. As the oil tube 300 increases in temperature during start up or decreases in temperature during cool down, for example, the mesh sleeve 330 will pass through the transition temperature and the shape memory alloy undergoes a phase change. With this phase change, the mesh sleeve 330 will change shape. For example, the mesh sleeve 330 has an axial length and the axial length may expand or contract as the mesh sleeve 330 passes through the transition temperature. As noted above, the mesh sleeve 330 abuts the interior surface 322, and with the phase change, the mesh sleeve 330 will break up the deposits that have formed on the interior surface 322.

The mesh 332 of the mesh sleeve 330 shown in FIG. 9 includes a network formed of a plurality of strands 334 of the shape memory alloy. In this embodiment, the strands 334 are integrally formed with each other, but the strands 334 may also be individual strands 334 that are either mechanically or metallurgically connected with each other in a pattern to form the mesh 332. The strands 334 are positioned relative to one another to define a plurality of openings 336 therebetween. The openings 336 of this embodiment are diamond shaped FIGS. 10A, 10B, 10C, and 10D show different patterns of a mesh 340, 350, 360, 370 that may be used in place of the mesh 332 of the mesh sleeve 330, discussed above, and unless otherwise specifically indicated, these meshes 340, 350, 360, 370 may be used in any of the embodiments discussed herein. The meshes 340, 350, 360, 370 shown in FIGS. 10A, 10B, 10C, and 10D are the same as the mesh 332 discussed above with the difference being mesh pattern.

The mesh 340 shown in FIG. 10A, includes a plurality of helical strands 342. Each helical strand 342 of this embodiment is parallel to another helical strand 342 and also crosses another helical strand 342 that is helical in an opposite direction. The plurality of helical strands 342 are positioned to form openings 344. The openings 344 in this embodiment have a diamond shape. Other than the shape, the features of the strands 334 and openings 336 of the embodiment discussed above also apply to the helical strands 342 and openings 344 openings of this embodiment.

The meshes 350, 360, 370 shown in FIGS. 10B, 10C, and 10D include strands 352, 362, 372 that extend in the circumferential direction c of the oil tube 300 (see FIG. 7) with openings 354, 364, 374 formed between adjacent strands 352, 362, 372 in the axial direction. Other than the shape, the features of the strands 334 and openings 336 of the embodiment discussed above also apply to the adjacent strands 352, 362, 372 and openings 354, 364, 374 openings of this embodiment. In FIG. 10B, the mesh 350 includes strands 352 having a saw-tooth pattern with teeth that are generally regular and have a generally uniform triangular shape. In FIG. 10C, the mesh 360 includes strands 362 having a saw-tooth pattern with teeth that are irregular having, for example, different heights and widths. The strands 372 of the mesh 370 shown in FIG. 10D also have a saw-tooth shaped, but each strand 372 is nested with an adjacent strand 372.

FIGS. 11A to 11R show meshes 381, 382, 383, 384, 385, 386, 387, 388, 389, 391, 392, 393, 394, 395, 396, 397, 398, 399 according to further embodiments. Meshes 381, 382, 383, 384, 385, 386, 387, 388, 389, 391, 392, 393, 394, 395, 396, 397, 398, 399 may be used in place of the mesh 332 of the mesh sleeve 330 (see FIG. 7), discussed above, and unless otherwise specifically indicated, these meshes 381, 382, 383, 384, 385, 386, 387, 388, 389, 391, 392, 393, 394, 395, 396, 397, 398, 399 may be used in any of the embodiments discussed herein. Like the mesh 332 discussed above, the meshes 381, 382, 383, 384, 385, 386, 387, 388, 389, 391, 392, 393, 394, 395, 396, 397, 398, 399 shown in FIGS. 11A to 11R each have a plurality of strands of the shape memory alloy positioned relative to each other to form openings. The strands and the openings may have different shapes or sizes as shown in these figures, which as will be discussed further below, results in different mesh densities and deformation factors for each mesh. Other than these differences the description of the strands 334 and openings 336 of the mesh 332 discussed above with regard to FIG. 9 also applies here, and a detailed description of these features is omitted here.

The following discussion of the mesh sleeve 330 uses mesh 332 as an example, but the following applies equally to mesh sleeves using the meshes 340, 350, 360, 370, 381, 382, 383, 384, 385, 386, 387, 388, 389, 391, 392, 393, 394, 395, 396, 397, 398, 399.

FIGS. 12A, 12B, and 12C are cross-sectional views, taken along line 9-9 in FIG. 7, of the oil tube 300 showing different attachments of the mesh sleeve 330 to the oil tube 300. The mesh sleeve 330 may be attached and positioned within the oil tube 300 using various suitable methods. The attachment method selected, however, should allow for movement of the mesh 332 along the interior surface 322 in the axial direction a of the oil tube 300. If the mesh 332 is overly constrained, the mesh 332 will buckle instead of sliding along the interior surface 322 and may not disrupt the layers of coke.

FIG. 12A shows a first attachment method and configuration of the mesh sleeve 330. The mesh sleeve 330 includes a solid (non-mesh) portion, which is referred to herein as a collar 338. The collar 338 may be annular and the mesh 332 is attached thereto. In this embodiment, the collar 338 is attached to the wall 320 and, more specifically, the interior surface 322. Any suitable attachment means, including mechanical fasteners, metallurgical bonding, or even interference fits may be used to attach the collar 338 to the interior surface 322. The mesh 332 extends above or below the collar 338 and is free to move relative to the interior surface 322, and, under the thermal cycling discussed above, the mesh 332 moves towards or away from the collar 338 disrupting the coke forming on the interior surface 322.

FIG. 12B shows another mesh sleeve 330 attached to the wall 320. The mesh sleeve 330 may have at least one collar 338, and, in this embodiment, the mesh sleeve 330 includes a plurality of collars 338. One of the collars 338 is attached to the wall 320 in the manner discussed above. The other collars 338 are free to move. The collars 338 are attached to each other by the mesh 332. Movement of the mesh 332 under the thermal cycling discussed above changes the relative distance between adjacent collars 338. In this embodiment, each of the collar 338 abuts the interior surface 322 and the movement of the collars 338 scrapes the interior surface 322, disrupting the formation of the coke.

FIG. 12C shows another mesh sleeve 330 attached to the wall 320. The mesh sleeve 330 is a hybrid of the mesh sleeves 330 shown in FIGS. 12A and 12B. In this embodiment, the mesh sleeve 330 includes two collars 338 positioned, respectively, at a top and a bottom of the mesh 332. Only one of the collars 338 is attached to the wall 320 in the manner discussed above.

FIGS. 13A to 13D show a process of installing the mesh sleeve 330 into the oil tube 300. FIG. 13A shows a starting or a memory configuration of the mesh sleeve 330. The mesh sleeve 330 is then crimped (or otherwise crushed) into a thin tube. The temperature of the crimping selected is based on the particular shape memory alloy used. FIG. 13B shows a compressed configuration of the mesh sleeve 330. Depending upon the particular shape memory alloy used, the crimping force is either held or released. FIG. 13C shows the mesh sleeve 330 being inserted into the oil tube 300 in the compressed configuration. The temperature range of the insertion is preferably set to maintain the mesh 332 of the mesh sleeve 330 in the same metallurgical phase as the phase used in the crimping step. The mesh sleeve 330 is then heated or the crimping force is released to expand the mesh sleeve 330 within the oil tube 300. FIG. 13D shows the mesh sleeve 330 in an expanded (installed) configuration within the oil tube.

In the embodiments discussed above, the mesh 332 is formed of a shape memory alloy, but the mesh 332 could also be formed using, for example, bimetal strands 334 having a first metal and the second metal. The two different metals used to form the mesh 332 have different thermal expansion coefficients such that the different thermal expansion coefficients drive movement of the mesh sleeve 330 in the manner discussed above under the thermal cycling of the engine 100. Metals that may be used in the bimetal strands 334 as the first and second metals for the applications discussed herein include, for example, steels, such as stainless steels, titanium, titanium alloys, nickel and nickel alloys such as Inconel©, RENE™, and Hastalloy™.

Figure 16:
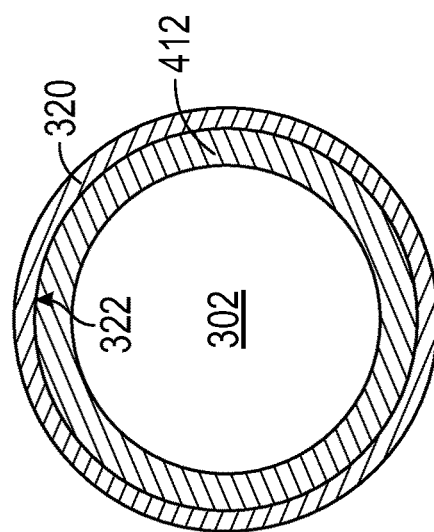
FIG. 16 is a cross-sectional view, taken along line 16-16 in FIG. 14, of the oil tube shown in FIG. 14.
Figure 15:
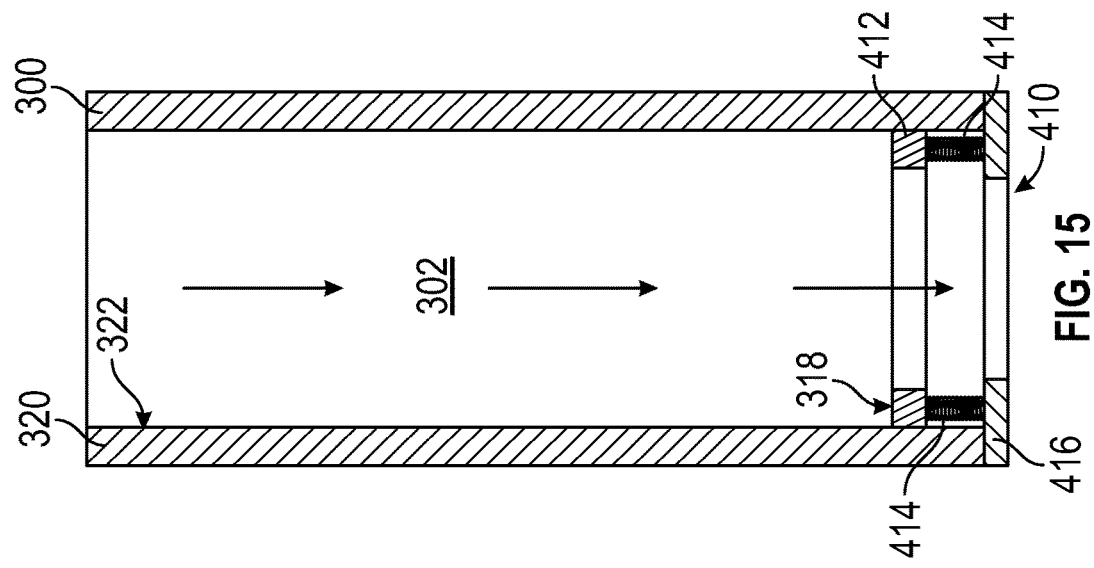
FIG. 15 is a cross-sectional view of the oil tube shown in FIG. 14.
Figure 14:
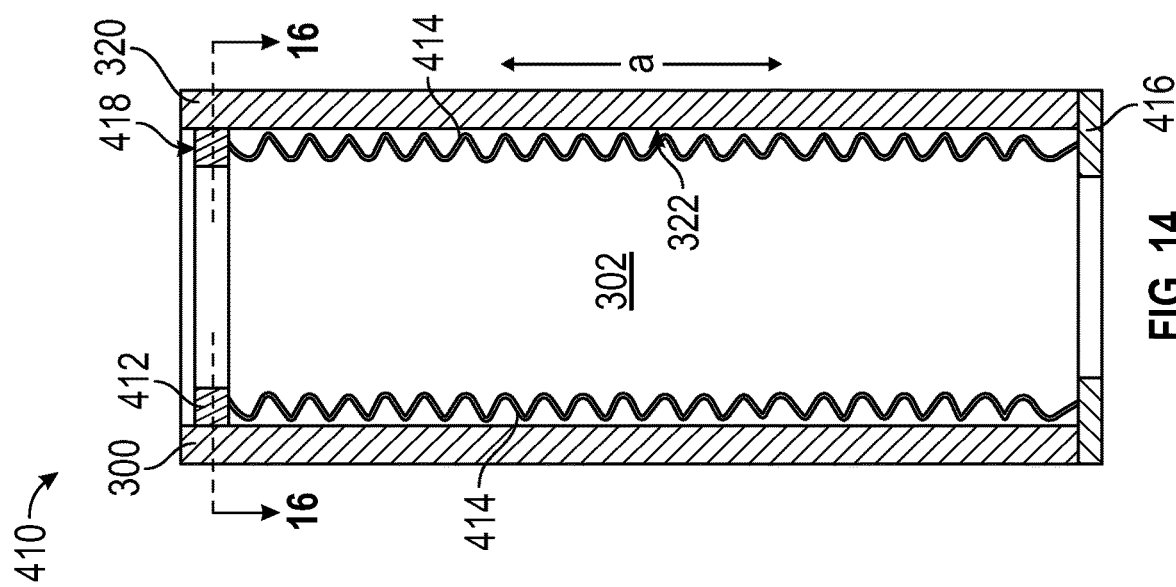
FIG. 14 is a cross-sectional view of an oil tube according to another embodiment.

FIGS. 14 to 16 show a movable sleeve assembly 410 according to another embodiment. FIGS. 14 and 15 are cross-sectional views of the oil tube 300. FIGS. 14 and 15 have a perspective similar to that of the cross-sectional views taken along line 9-9 in FIG. 7, but FIGS. 14 and 15 includes the movable sleeve assembly 410 of this embodiment. FIG. 16 is a cross-sectional view, taken along line 16-16 in FIG. 14, of the oil tube 300 and the movable sleeve assembly 410. Although shown as circular in this embodiment, the wall 320 may have other suitable shapes such as the elliptical shape shown in FIG. 7. The movable sleeve assembly 410 includes a movable sleeve 412 and a spring 414. The movable sleeve assembly 410 of this embodiment uses the flow of the oil within the flow passage 302, together with the spring 414 to move the movable sleeve 412.

FIG. 14 shows the oil tube 300 when oil is not flowing through the flow passage 302, such as a shutdown condition, and FIG. 15 shows the oil tube 300 when oil is flowing through the flow passage 302, such as when the engine 100 is operating. The movable sleeve 412 may be a solid annular ring, similar to the collar 338 discussed above. The movable sleeve 412 is positioned within the oil tube 300 such that an outer edge of the movable sleeve 412 abuts the interior surface 322. The movable sleeve 412 is attached to one end of the spring 414, and, in this embodiment, the other end of the spring 414 is attached to a flange 416 of the oil tube 300.

The oil flowing through the flow passage 302 flows through the flow passage 302 with an oil pressure. The oil thus presses on a circumferential surface 418 of the movable sleeve 412 in the axial direction a of the oil tube 300. The oil presses against the spring force of the spring 414. The size of the circumferential surface 418 and the spring force of the spring 414 are configured such that the oil pressure moves the movable sleeve 412 towards one end of the oil tube 300. The circumferential surface 418 is an example of a contact surface to which a pressure may be applied to move the movable sleeve 412. In this embodiment, the oil pressure and the flow of the oil in the flow passage 302 press the movable sleeve 412 toward the inner end 316 (see FIG. 6), compressing the spring 414, as shown in FIG. 15. When the oil stops flowing though the flow passage 302, such as when the engine 100 is shut down, the spring 414 presses the movable sleeve 412 towards the other end of the oil tube 300 (the outer end 314, see FIG. 6, in this embodiment), as shown in FIG. 14. This movement of the movable sleeve 412 scrapes the interior surface 322 and disrupts the coke deposits forming on the interior surface 322.

The spring 414 may be any suitable spring, including, for example, a wave spring or a bellows spring. Suitable wave springs include those made by Smalley, of Lake Zurich, Illinois. Preferably, the spring 414 is a spring that is suitable for relatively large distances of travel such that one spring 414 and movable sleeve 412 are used within the oil tube 300 and the movable sleeve 412 covers nearly the entire length of the central section 312 (see FIG. 6) of the oil tube 300.

FIGS. 17 to 20 show a movable sleeve assembly 420 according to another embodiment. FIGS. 17 and 18 are cross-sectional views of an oil tube 300a. FIGS. 17 and 18 have a perspective similar to that of the cross-sectional views taken along line 9-9 in FIG. 7, but FIGS. 17 and 18 includes the movable sleeve assembly 420 of this embodiment. FIG. 19 is a cross-sectional view, taken along line 19-19 in FIG. 17, of the oil tube 300, and FIG. 20 is a detail view, showing detail 20 in FIG. 17, of an inner movable sleeve 422 of the movable sleeve assembly 420. In the embodiment discussed above with reference to FIGS. 14 to 16, the oil pressure and the flow of the oil through the flow passage 302 was used to drive movement of the movable sleeve 412. In this embodiment, another pressure source is used to drive movement of the movable sleeve assembly 420. In this embodiment, the other pressure source is compressor bleed air 22, but any suitable pneumatic or hydraulic pressure source may be used. The same reference numerals will be used for components of the movable sleeve assembly 420 of this embodiment that are the same or similar to the components of the movable sleeve assembly 410 discussed above. The description of these components above also applies to this embodiment, and a detailed description of these components is omitted here.

The oil tube 300a is similar to the oil tube 300 discussed above and may be used in place of the oil tube 300 discussed above. The same reference numerals will be used for components of the oil tube 300a of this embodiment that are the same or similar to the components of the oil tube 300 discussed above. The description of these components above also applies to this embodiment, and a detailed description of these components is omitted here. The oil tube 300a of this embodiment is a double-walled tube having an inner wall 324 and an outer wall 326. The interior surface 322 is formed on the inner wall 324, and the inner wall 324 and the outer wall 326 are positioned to define a cavity 304 therebetween. Although shown as circular in this embodiment, the inner wall 324 and the outer wall 326 may have other suitable shapes such as the elliptical shape shown in FIG. 7.

The movable sleeve assembly 420 of this embodiment includes the inner movable sleeve 422 and an outer movable sleeve 424. The outer movable sleeve 424 is positioned within the cavity 304 and connected to the spring 414. In this embodiment, the spring 414 is located within the cavity 304. The cavity 304 is fluidly connected to the pressure source, such as the compressor bleed air 22. When the engine 100 is operating, the compressor bleed air 22 is provided to the cavity 304 and presses on a circumferential surface 426 of the outer movable sleeve 424 in the axial direction a of the oil tube 300a. The compressor bleed air 22 presses against the spring force of the spring 414. The size of the circumferential surface 426 and spring force of the spring 414 are configured such that the pressure of the compressor bleed air 22 moves the outer movable sleeve 424 towards one end of the oil tube 300. In this embodiment, the compressor bleed air 22 presses the outer movable sleeve 424 toward the inner end 316 (see FIG. 6), compressing the spring 414, as shown in FIG. 18. When the engine 100 is shut down, the compressor bleed air 22 is not provided to the cavity 304 and the spring 414 presses the outer movable sleeve 424 towards the other end of the oil tube 300 (the outer end 314, see FIG. 6, in this embodiment), as shown in FIG. 17.

The inner movable sleeve 422 is coupled to the outer movable sleeve 424, and inner movable sleeve 422 moves along with the outer movable sleeve 424. In this embodiment, the inner movable sleeve 422 is magnetically coupled to the outer movable sleeve 424. For example, the outer movable sleeve 424 may be magnetic and the inner movable sleeve 422 may include a plurality of roller balls 428, shown in FIG. 20, that are attracted to the outer movable sleeve 424. The roller balls 428 may also be used to help guide the inner movable sleeve 422 along the interior surface 322. The inner movable sleeve 422 abuts the interior surface 322 and movement of the inner movable sleeve 422 scrapes the interior surface 322, disrupting the coke deposits forming on the interior surface 322. The inner movable sleeve 422 has a shape suitable for disrupting the coke deposits.

Figures 21, 22:
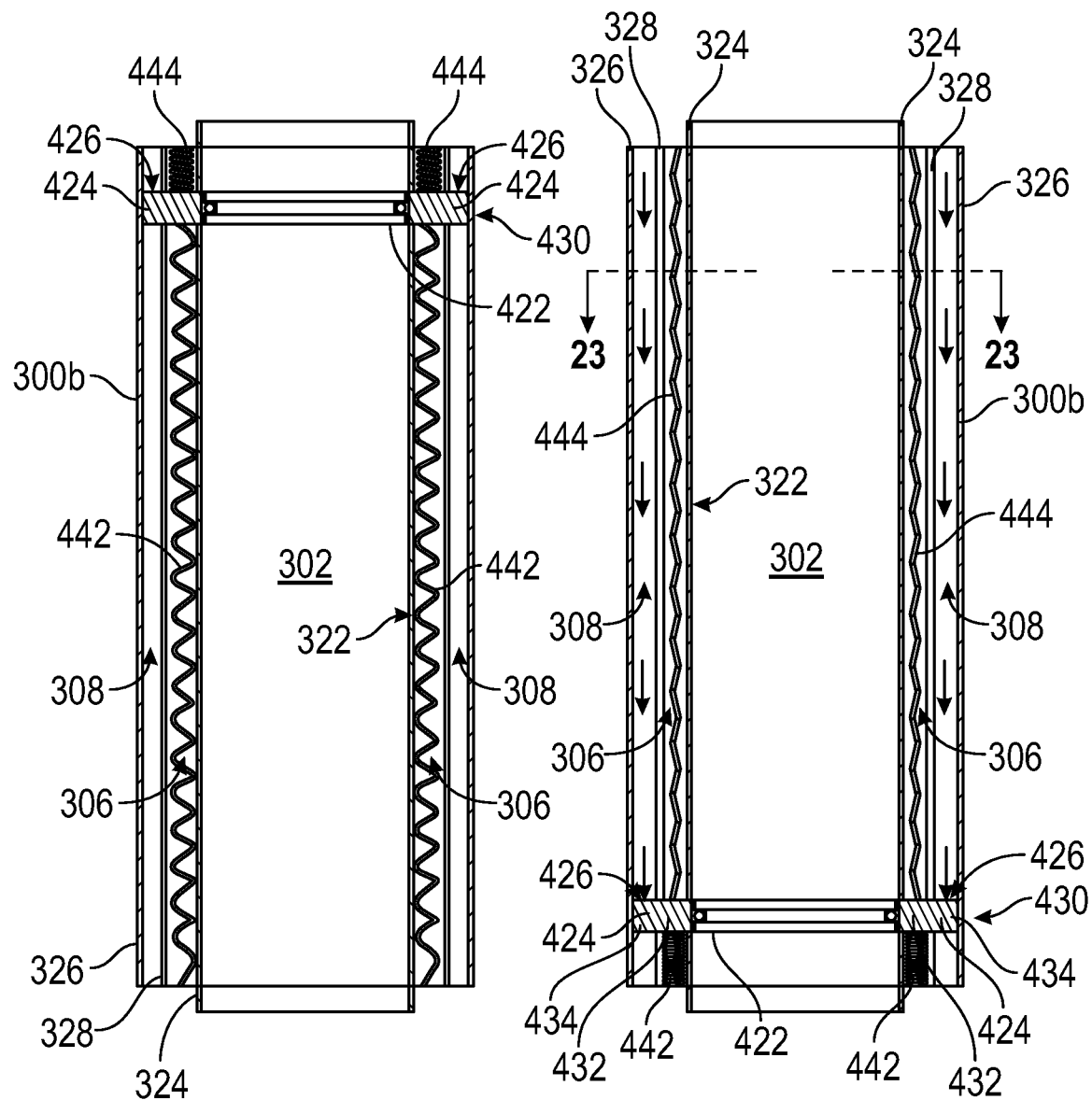
FIG. 21 is a cross-sectional view of an oil tube according to another embodiment.
FIG. 22 is a cross-sectional view of the oil tube shown in FIG. 21.
Figure 23:
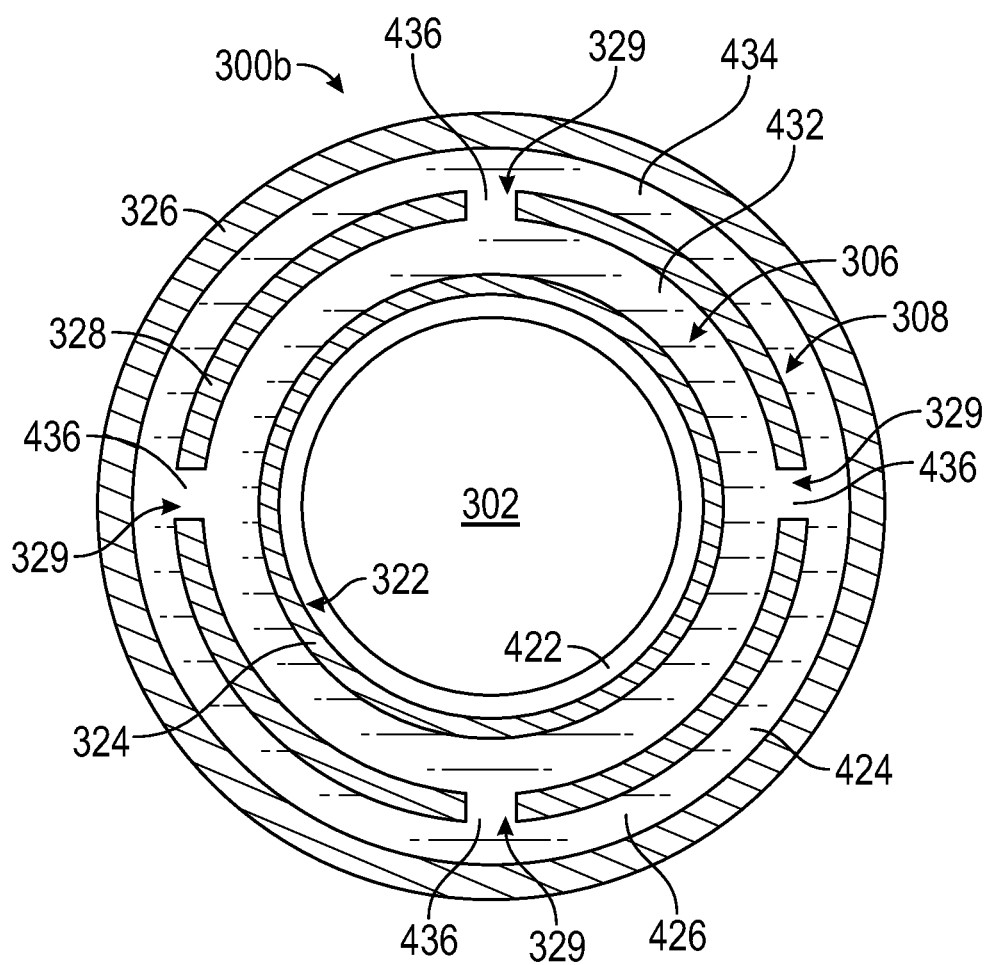
FIG. 23 is a cross-sectional view, taken along line 23-23 in FIG. 22, of the oil tube shown in FIG. 22.

FIGS. 21 to 23 show a movable sleeve assembly 430 according to another embodiment. FIGS. 21 and 22 are cross-sectional views of an oil tube 300b. FIGS. 21 and 22 have a perspective similar to that of the cross-sectional views taken along line 9-9 in FIG. 7, but FIGS. 22 and 22 includes the movable sleeve assembly 430 of this embodiment. FIG. 23 is a cross-sectional view, taken along line 23-23 in FIG. 22, of the oil tube 300b. A second spring 444 (discussed further below) is omitted in FIG. 23 for clarity. The movable sleeve assembly 430 of this embodiment is similar to the movable sleeve assembly 420 of the embodiment discussed above with reference to FIGS. 17 to 20. In the following discussion, the same reference numerals are used for similar components and a detailed description of those components is omitted here. In this embodiment, the outer movable sleeve 424 is attached to two springs, a first spring 442 and a second spring 444. The first spring 442 is positioned and operates like the spring 414 discussed in the embodiments above. The second spring 444 is attached to the outer movable sleeve 424 on an opposite side of the outer movable sleeve 424 from the first spring 442. The first spring 442 and the second spring 444 have different spring constants with the first spring 442 having a greater spring constant than the second spring 444 in this embodiment. The second spring 444 helps move the movable sleeve assembly 430 and, more specifically, the outer movable sleeve 424 in either direction. In this embodiment, the second spring 444 is shown as a baffle spring, but as discussed above, any suitable spring may be used.

The compressor bleed air 22 is used to provide the pressure to move the movable sleeve assembly 430 and, more specifically, the outer movable sleeve 424. To accommodate both the compressor bleed air 22, the first spring 442, and the second spring 444, the oil tube 300b of this embodiment is a triple-walled tube. The oil tube 300b is similar to the oil tube 300a discussed above and may be used in place of the oil tube 300a discussed above. The same reference numerals will be used for components of the oil tube 300b of this embodiment that are the same or similar to the components of the oil tube 300a discussed above. The description of these components above also applies to this embodiment, and a detailed description of these components is omitted here. The oil tube 300b has a middle wall 328 positioned between the inner wall 324 and the outer wall 326. An inner cavity 306 is defined between the inner wall 324 and the middle wall 328, and an outer cavity 308 is defined between the middle wall 328 and the outer wall 326. The outer movable sleeve 424 includes a portion in each of the inner cavity 306 and the outer cavity 308, an inner portion 432 and an outer portion 434, respectively. In this embodiment, the outer cavity 308 is fluidly connected to the pressure source, such as the compressor bleed air 22, and the circumferential surface 426 is located on the portion of the outer movable sleeve 424 in the outer cavity 308 (outer portion 434). The first spring 442 and the second spring 444 are located in the inner cavity 306 and connected to the portion of the outer movable sleeve 424 in the inner cavity 306 (inner portion 432). The middle wall 328 may include a plurality of slots 329, and the inner portion 432 of the outer movable sleeve 424 is connected to the outer portion 434 of the outer movable sleeve 424 by connecting portions 436 through the plurality of slots 329.

FIG. 21 shows a configuration of the movable sleeve assembly 430 with the engine 100 shut down, and FIG. 22 shows the movable sleeve assembly 430 with the engine 100 operating and compressor bleed air 22 being provided to the outer cavity 308.

Figure 24:
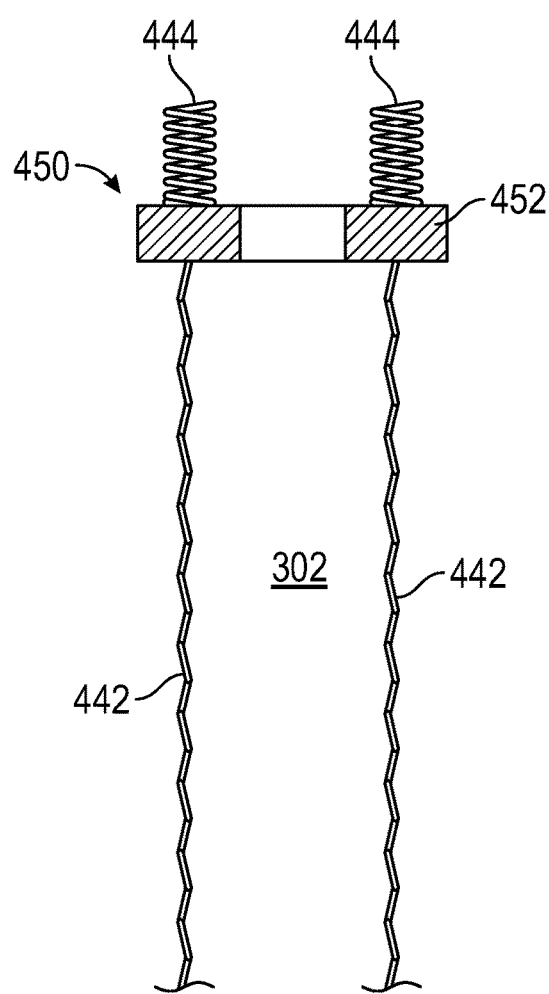
FIG. 24 is a cross-sectional view of an oil tube according to another embodiment.
Figure 25:
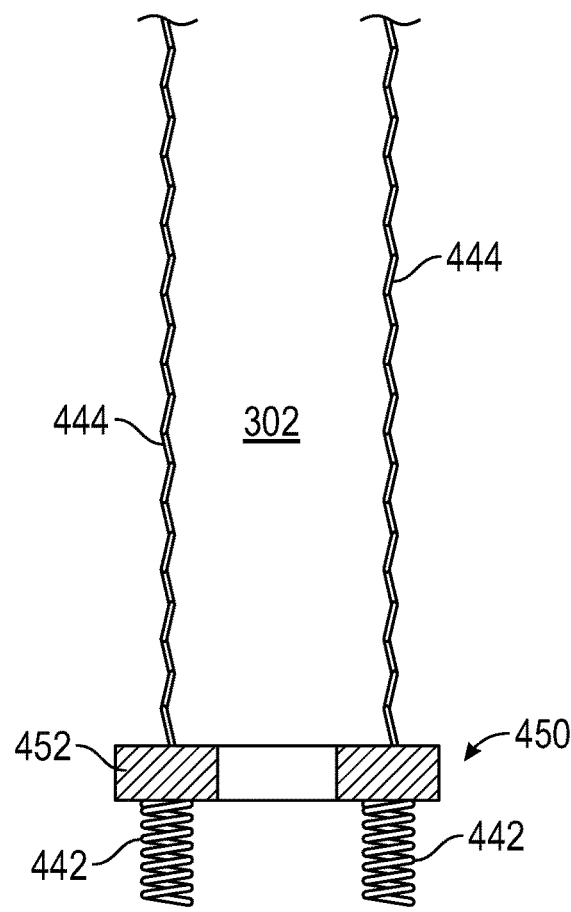
FIG. 25 is a cross-sectional view of the oil tube shown in FIG. 24.

FIGS. 24 and 25 show a movable sleeve assembly 450 according to another embodiment. The movable sleeve assembly 450 of this embodiment is similar to the movable sleeve assembly 430 of the embodiment discussed above with reference to FIGS. 21 and 22. In the following discussion, the same reference numerals are used for similar components and a detailed description of those components is omitted here. Like the previous embodiment, the movable sleeve assembly 450 of this embodiment includes a movable sleeve 452 attached to the first spring 442 and the second spring 444. The first spring 442 and the second spring 444 are each preferably bellows springs in this embodiment as the first spring 442 and the second spring 444 together with the movable sleeve 452 form the walls of the oil tube, and a separate wall is omitted. The movable sleeve assembly 450 may thus be used in place of any of the oil tubes 300, 300a, 300b discussed above. The movable sleeve 452 is moved by the flow of oil through the flow passage 302 in the manner discussed above with reference to FIGS. 14 to 16, and movement of the movable sleeve 452 results in movement of the first spring 442 and the second spring 444. Movement of the first spring 442 and the second spring 444 breaks up the coke deposits.

Returning to the embodiment discussed above with reference to FIGS. 7 to 13C, different variations of the mesh sleeve 330 formed from a shape memory alloy are possible, provided the resultant combination of mesh and tube satisfy certain criteria described below. As discussed above with reference to FIGS. 10A to 11R, for example, the mesh sleeve 330 may include a mesh (e.g., mesh 332) having have many different geometries and shapes. Moreover, the size and the attachment arrangement of the strands (e.g., strands 334) and resulting size and shape of the openings (e.g., openings 336) can also vary. Different shape memory alloys can be used. Selecting the right combination of these features for a particular application is critical. Otherwise, the mesh sleeve 330 may not have a sufficient range of movement for a given application to disrupt the coke formation. For clarity in the following discussion, the reference numerals for the mesh 332 of FIG. 9 are used as representative of the different meshes discussed above.

During the course of evaluating the variations possible in the design, both the benefits in terms of, e.g., scrapping efficiency vs. reliability or efficiency in removing or mitigating coke, the inventors, discovered, unexpectedly, that there exists a relationship among select features of the mesh 332, the working temperatures of the wall 320 and the oil, and the material of the wall 320 that produced superior results over the other numerous other designs considered. This relationship is referred to by the inventors as the mesh activation parameter (MAP) for lube oil coke cleaning. MAP is a dimensionless factor defined according to the following relationship (1):

$$\text{Mesh Activation Parameter } (MAP) = \frac{V'}{V} \times \frac{T_{oil}}{T_{metal}} \times \left|\frac{\Delta H}{H}\right| \times \frac{E_{mesh}}{E_{tube}} \quad (1)$$

The first factor of the MAP, as shown in relationship (1), is referred to herein as the mesh density (V'/V). As noted above, the mesh 332 includes openings 336 and, thus, the volume of the mesh 332 (V') is less than the volume if the mesh sleeve 330 were solid (V and referred to herein as solid sleeve volume). The mesh density (V'/V) is the volume of the mesh 332 (V') divided by the solid sleeve volume (V). The volume of the mesh 332 (V') can be calculated by suitable methods including, for example, calculations from computer-aided design (CAD) models or displacement methods where the mesh is submerged in a liquid and the volume of the displaced liquid is used to calculate the volume of the mesh 332 (V'). The solid sleeve volume (V) can be calculated by using the overall dimensions of the mesh sleeve 330. These volumetric calculations or measurements are taken in the as assembled condition, such as at room temperature.

The second factor of the MAP, as shown in relationship (1), is referred to herein as a working temperature ratio ($T_{oil}/T_{metal}$). The working temperature ratio ($T_{oil}/T_{metal}$) is the ratio of the temperature of the oil ($T_{oil}$) to the temperature of the wall 320 ($T_{metal}$). These temperatures are taken as the maximum expected normal operating temperatures of the oil and the wall 320, respectively.

The third factor of the MAP, as shown in relationship (1), is referred to herein as a deformation factor (ΔH/H). The mesh sleeve 330 has an initial shape including an axial length and a diameter in the as assembled state. A position on the mesh sleeve 330 also has an initial angular position. This initial axial length, initial diameter, or initial angular position is taken as the initial shape (H). The length, diameter, and/or the angular position of the mesh sleeve 330 will change under the thermal cycling conditions discussed above. The angular position changes by, for example, the mesh sleeve 330 twisting. The change in length, diameter or the angular position is referred to herein as the change in shape ΔH. The deformation factor is the change in shape (ΔH) divided by the initial shape (H), such as the change in length divided by the initial length or the change in diameter divided by the initial diameter or the change in angular position divided by the initial angular position. In some embodiments, the mesh sleeve 330 will grow at higher temperatures and, in other embodiments, the mesh sleeve 330 will shrink at higher temperatures. Accordingly, the absolute value of the deformation factor is used to calculate the MAP.

The fourth factor of the MAP, as shown in relationship (1), is referred to herein as a stiffness ratio ($E_{mesh}/E_{tube}$). Each of the shape memory alloy used for the mesh 332 and the material used for the wall 320 have an elastic modulus and, more specifically, a Young's modulus. The stiffness ratio ($E_{mesh}/E_{tube}$) is the ratio of the elastic modulus of the mesh 332 to the elastic modulus of the wall 320 and, more specifically, the ratio of the Young's modulus ($E_{mesh}$) of the shape memory alloy used for the mesh 332 to the Young's modulus ($E_{tube}$) of the material used for the wall 320. To the extent there is a temperature dependency of the Young's modulus (elastic modulus), the Young's modulus (elastic modulus) is taken in the as assembled condition, such as at room temperature.

As discussed further below, we have identified a range of the MAP that prevents coke blockages from forming in the oil tube 300 for a set of operational conditions. More specifically, under a given set of scavenge oil temperatures and operational temperatures of the oil tube 300 (conduit), the identified ranges of the MAP will be result in sufficient thermal deformation of the mesh sleeve 330 to break up coke deposits on the interior surface 322 of the wall 320.

Tables 1 and 2 describe exemplary embodiments 1 to 22. Table 1 provides values for the temperature and Young's modulus used to calculate the MAP for different engine environments. Each engine is a high by-pass turbofan engine, such as the engine 100 of FIG. 2 described above, but have different operating conditions and sizes, giving rise to different oil temperatures ($T_{oil}$) and temperatures of the wall 320 ($T_{metal}$).

TABLE 1

| Embodiment | Oil Temperature ($T_{oil}$) (° F.) | Wall Temperature ($T_{metal}$) (° F.) | Working Temperature Ratio ($T_{oil}/T_{metal}$) | Young's Modulus of the Wall ($E_{tube}$) (GPa) |
|---|---|---|---|---|
| 1 | 200 | 450 | 0.444 | 210 |
| 2 | 200 | 450 | 0.444 | 210 |
| 3 | 200 | 450 | 0.444 | 210 |
| 4 | 200 | 450 | 0.444 | 210 |
| 5 | 300 | 450 | 0.667 | 210 |
| 6 | 300 | 450 | 0.667 | 210 |
| 7 | 325 | 450 | 0.722 | 210 |
| 8 | 325 | 450 | 0.722 | 210 |
| 9 | 280 | 450 | 0.622 | 210 |
| 10 | 280 | 450 | 0.622 | 210 |
| 11 | 200 | 500 | 0.4 | 210 |
| 12 | 200 | 500 | 0.4 | 210 |
| 13 | 450 | 450 | 1 | 210 |
| 14 | 450 | 450 | 1 | 210 |
| 15 | 180 | 400 | 0.45 | 210 |
| 16 | 180 | 400 | 0.45 | 210 |
| 17 | 350 | 450 | 0.778 | 210 |
| 18 | 350 | 450 | 0.778 | 210 |
| 19 | 380 | 450 | 0.844 | 210 |
| 20 | 380 | 450 | 0.844 | 210 |
| 21 | 450 | 550 | 0.818 | 210 |
| 22 | 450 | 550 | 0.818 | 210 |

Each of the embodiments uses a mesh sleeve 330 located within the oil tube 300. The mesh sleeve 330 and the mesh 332 may be any one of the mesh sleeves 330 and meshes 332, discussed above. Table 2 gives values used to calculate the MAP for the mesh 332 used in the mesh sleeve 330 of each embodiment. Table 2 also identifies the resultant MAP for each embodiment.

TABLE 2

| Embodiment | Mesh Density (V'/V) | Deformation Factor (\|ΔH/H\|) | Young's Modulus of the Mesh ($E_{mesh}$) (GPa) | Stiffness Ratio ($E_{mesh}/E_{tube}$) | MAP |
|---|---|---|---|---|---|
| 1 | 0.05 | 0.1 | 90 | 0.429 | 0.001 |
| 2 | 0.5 | 0.9 | 90 | 0.429 | 0.086 |
| 3 | 0.05 | 0.1 | 150 | 0.714 | 0.002 |
| 4 | 0.5 | 0.9 | 150 | 0.714 | 0.143 |
| 5 | 0.05 | 0.1 | 90 | 0.429 | 0.001 |
| 6 | 0.9 | 0.9 | 90 | 0.429 | 0.232 |
| 7 | 0.05 | 0.1 | 90 | 0.429 | 0.002 |
| 8 | 0.9 | 0.9 | 90 | 0.429 | 0.251 |
| 9 | 0.05 | 0.1 | 90 | 0.429 | 0.001 |
| 10 | 0.9 | 0.9 | 90 | 0.429 | 0.216 |
| 11 | 0.05 | 0.4 | 50 | 0.238 | 0.002 |
| 12 | 0.9 | 0.9 | 50 | 0.238 | 0.077 |
| 13 | 0.05 | 0.1 | 200 | 0.952 | 0.005 |
| 14 | 0.9 | 0.9 | 200 | 0.952 | 0.771 |
| 15 | 0.1 | 0.45 | 210 | 1.000 | 0.020 |
| 16 | 0.5 | 0.55 | 210 | 1.000 | 0.124 |
| 17 | 0.4 | 0.35 | 90 | 0.429 | 0.047 |
| 18 | 0.9 | 0.6 | 90 | 0.429 | 0.180 |
| 19 | 0.3 | 0.4 | 90 | 0.429 | 0.043 |
| 20 | 0.9 | 0.6 | 90 | 0.429 | 0.195 |
| 21 | 0.5 | 0.4 | 90 | 0.429 | 0.070 |
| 22 | 0.9 | 0.6 | 90 | 0.429 | 0.189 |

The mesh density (V'/V) may be between one tenth and one. To withstand the operating conditions of the oil tube 300, the mesh 332 of the mesh sleeve 330 will include a minimum number of strands 334, and, thus, the mesh density (V'/V) preferably is greater than one tenth. The mesh density (V'/V) has a limit of a solid sleeve, and, thus, the mesh density (V'/V) preferably is less than one. The density of the mesh impacts the flow dynamics of the oil through the flow passage 302 of the oil tube 300, and different densities, thus, result resulting in different resistances (pressure drops) within the flow passage 302. The mesh density may also impact the amount of movement and, thus, the ability of the mesh sleeve 330 to break up coke deposits with higher densities resulting in less movement. Balancing these considerations and other considerations discussed below, the mesh density (V'/V) is more preferably from two tenths to five tenths.

Some small amount of movement of the mesh sleeve 330 is necessary to break-up the coke deposits, and, in some embodiments, the absolute value of the deformation factor (ΔH/H) may be one tenth or greater. Larger amounts of movement, however, are advantageous in breaking-up the coke deposits and the absolute value of the deformation factor (ΔH/H) is preferably seven tenths or greater. Movements that are too large, however, may introduce other problems such as reduced reliability or blockage. To avoid some of the issues discussed below related to the dynamic response of the mesh sleeve 330 and oil tube 300, the absolute value of the deformation factor (ΔH/H) is preferably nine tenths or less. The absolute value of the deformation factor (ΔH/H), thus, may be from one tenth to nine tenths and, preferably, from seven tenths to nine tenths.

There are a wide verity of shape memory alloys that can be used to move the mesh sleeve 330 in the manner discussed herein and the Young's modulus ($E_{mesh}$) of these shape memory alloy used for the mesh 332 range from fifty gigapascals to two hundred ten gigapascals. When considered with typical materials used for the oil tube 300 the stiffness ratio ($E_{mesh}/Et_{be}$), thus, may be from two tenths to ninety-six hundredths. The engine 100 includes many rotating components, as discussed above, producing various vibrations at different excitation frequencies. The mesh sleeve 330 is fixed, as discussed above, so that it can move. Because the mesh sleeve 330 can move, the mesh sleeve may dynamically respond to the vibrations. The selection of the stiffness ratio ($E_{mesh}/E_{tube}$) in combination with the mesh density (V'/V) and the deformation factor (ΔH/H) is preferably selected to avoid resonate frequencies and other dynamic responses of the mesh sleeve 330 and the oil tube 300, particularly those frequencies that can lead to inelastic acoustic responses and other responses leading to cyclic failure of the oil tube 300. Accordingly, the stiffness ratio ($E_{mesh}/E_{tube}$) preferably is from five tenths to seven tenths.

Figure 26:
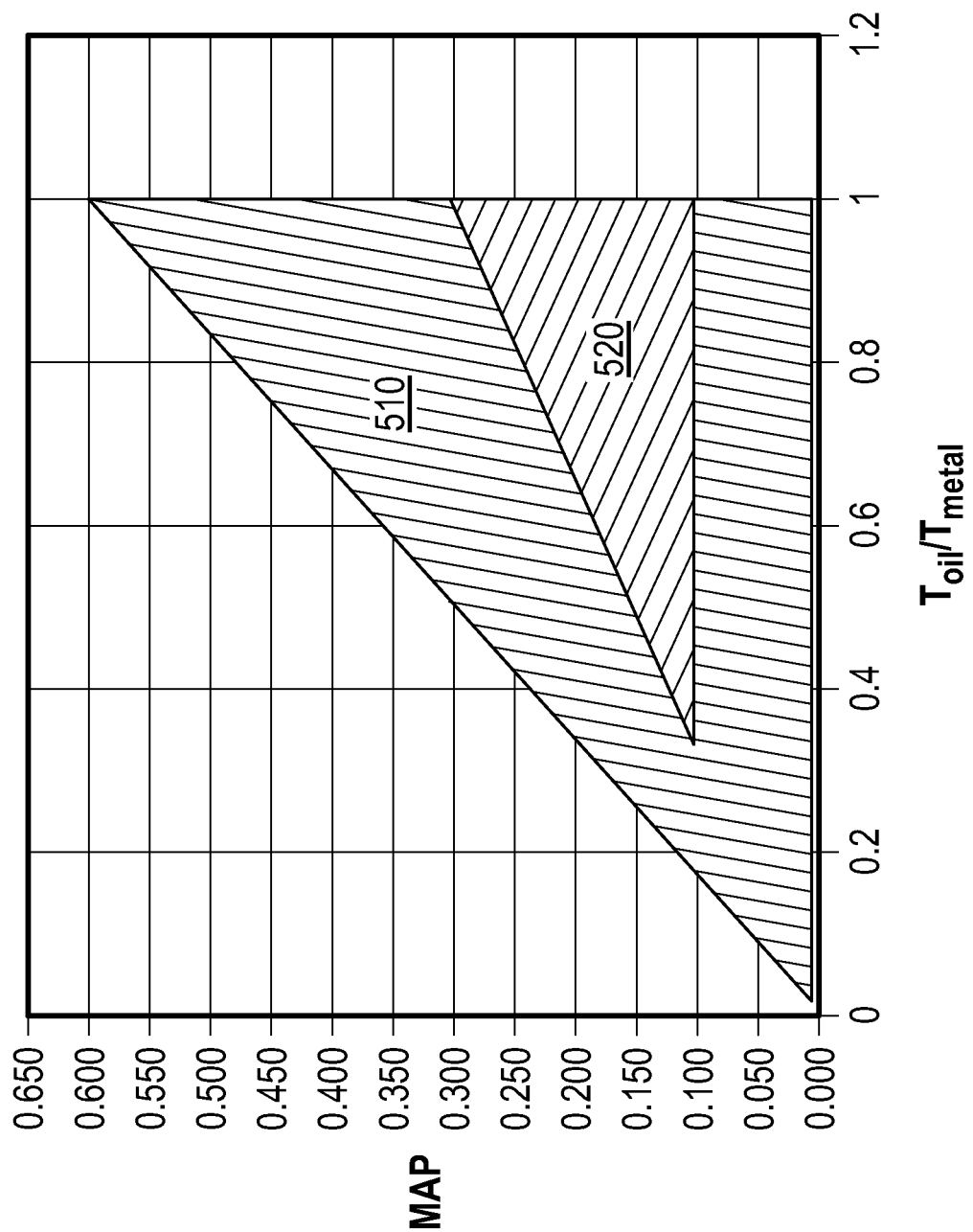
FIG. 26 is a graph illustrating a mesh activation parameter (MAP) as a function of the ratio of the oil temperature to the temperature of the oil tube, according to embodiments of the present disclosure.
Figure 27:
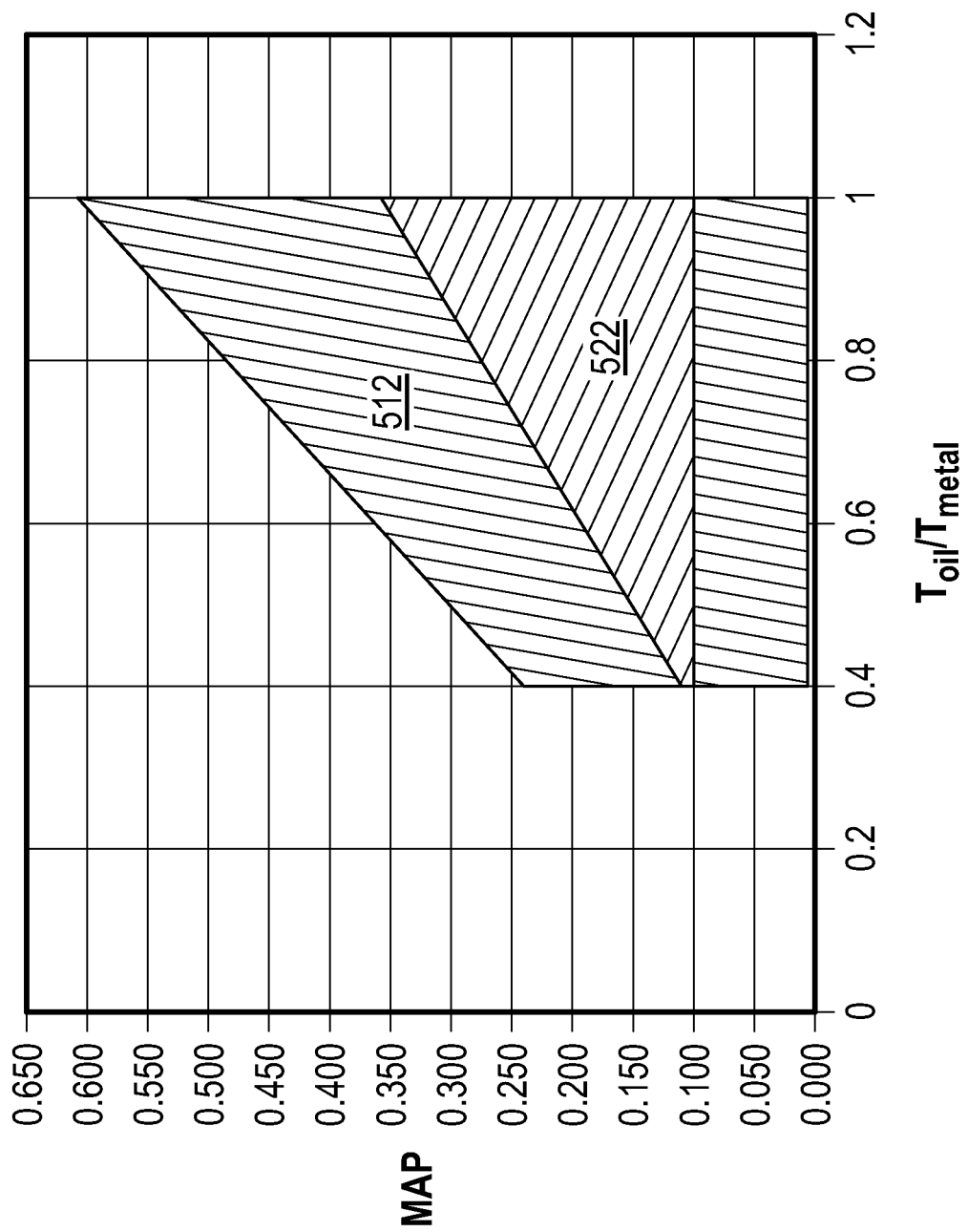
FIG. 27 is another graph illustrating a mesh activation parameter (MAP) as a function of the ratio of the oil temperature to the temperature of the oil tube, according to embodiments of the present disclosure.

FIGS. 26 and 27 represent, in graph form, the MAP as a function of the working temperature ratio ($T_{oil}/T_{metal}$). In FIG. 26, the cross-hatched areas present the boundaries of the MAP for configurations of the mesh 332 that may result in a mesh sleeve 330 that provides sufficient movement to disturb the coke formation within the engine 100. As can be seen in FIG. 26, the boundaries of the MAP and, thus, suitable configurations of the mesh 332, change based on oil temperature ($T_{oil}$) and temperature of the wall 320 ($T_{metal}$) and, more specifically, the working temperature ratio ($T_{oil}/T_{metal}$) for a given engine application. One set of preferred boundaries for the MAP is shown by an area 510. The MAP may be six tenths or less and may be from one ten thousandths to six tenths. As can be seen in FIG. 26 this range of the MAP is given for a working temperature ratio ($T_{oil}/T_{metal}$) of up to one. The MAP is a linear function of working temperature ratio ($T_{oil}/T_{metal}$). The upper bound for the MAP may linearly decrease from six tenths for working temperature ratios ($T_{oil}/T_{metal}$), so that the upper bound of the MAP for area 510 is given by the following relationship (2):

Preferred Upper Bound of (2)

$$\text{Mesh Activation Parameter } (MAP) = 0.6 \times \frac{T_{oil}}{T_{metal}}$$

One set of more preferred boundaries for the MAP is shown by an area 520. The MAP may be three tenths or less and may be from one tenth to three tenths. As can be seen in FIG. 26, this range of the MAP is given for a working temperature ratio ($T_{oil}/T_{metal}$) of one. This more preferred upper bound for the MAP is given by the following relationship (3):

More Preferred Upper Bound of (3)

$$\text{Mesh Activation Parameter } (MAP) = 0.3 \times \frac{T_{oil}}{T_{metal}}$$

For many of the aircraft applications discussed herein, coke does not form at working temperature ratios ($T_{oil}/T_{metal}$) less than four tenths, and, thus, in some embodiments, the working temperature ratio ($T_{oil}/T_{metal}$) is from four tenths to one. FIG. 27 shows a set of preferred boundaries for the MAP, given by an area 512, and a set of more preferred boundaries for the MAP, given by an area 522. The boundaries of area 512 and area 522 are the same as the boundaries for area 510 and area 520 of FIG. 26, respectively, but the lower bound for the working temperature ratio ($T_{oil}/T_{metal}$) is four tenths. At a working temperature ratio ($T_{oil}/T_{metal}$) of four tenths, the MAP may be from one ten thousandths to twenty-four hundredths and, more preferably, from one tenth to twelve hundredths.

Further aspects of the present disclosure are provided by the subject matter of the following clauses.

A self-cleaning conduit for a hydrocarbon fluid including a tube and a movable sleeve. The tube has an interior surface defining a flow passage for the hydrocarbon fluid. The movable sleeve is positioned within the flow passage to abut the interior surface and is movable along the interior surface in response to a change in an operating characteristic of the conduit to break-up deposits on the interior surface.

The conduit of the preceding clause, wherein the movable sleeve is a mesh sleeve including a mesh.

The conduit of any preceding clause, wherein the mesh includes a plurality of bimetal strands, and the change in the operating characteristic is a change in temperature of the mesh.

The conduit of any preceding clause, wherein the movable sleeve includes a collar abutting the interior surface of the tube and being movable along the interior surface by the mesh.

The conduit of any preceding clause, wherein the movable sleeve includes a plurality of collars abutting the interior surface of the tube and at least one collar of the plurality of collars being movable along the interior surface by the mesh.

The conduit of any preceding clause, wherein the movable sleeve includes a collar attached to the interior surface of the tube.

The conduit of any preceding clause, wherein the collar is attached to the interior surface of the tube by an interference fit.

The conduit of any preceding clause, wherein the mesh includes a plurality of strands formed of a shape memory alloy, and the change in the operating characteristic is a change in temperature of the mesh.

The conduit of any preceding clause, wherein the shape memory alloy is one of a nickel-titanium alloy, a cobalt-nickel-aluminum alloy, or a nickel-iron-gallium alloy.

The conduit of any preceding clause, further comprising a movable sleeve assembly including the movable sleeve and at least one spring connected to the movable sleeve.

The conduit of any preceding clause, wherein the movable sleeve includes a contact surface, the movable sleeve being positioned in the flow passage to have the hydrocarbon fluid press on the contact surface when the hydrocarbon fluid flows through the flow passage and moves the movable sleeve toward one end of the tube against the spring force of the spring, the flow of the hydrocarbon fluid within the flow passage being the change in the operating characteristic of the conduit.

The conduit of any preceding clause, wherein the movable sleeve is annular and has a circumferential surface, the circumferential surface being the contact surface.

The conduit of any preceding clause, wherein the tube is a multi-walled tube having an inner wall and an outer wall, the interior surface being formed on the inner wall, and the inner wall and the outer wall are positioned to define a cavity therebetween, the cavity being fluidly connected to a pressure source, pressure within the cavity from the pressure source being the change in an operating characteristic of the conduit, and wherein the movable sleeve includes an inner movable sleeve and an outer movable sleeve, the spring being attached to the outer movable sleeve, the outer movable sleeve being positioned within the cavity and including a contact surface, and, when the cavity is receiving pressure from the pressure source, the pressure presses on the contact surface to move the outer movable sleeve toward one end of the tube against the spring force of the spring, the inner movable sleeve being positioned within the flow passage to abut the interior surface, and the inner movable sleeve being coupled to the outer movable sleeve to move along the interior surface to move when the outer movable sleeve moves.

The conduit of any preceding clause, wherein the inner movable sleeve is magnetically coupled to the outer movable sleeve.

The conduit of any preceding clause, wherein the spring is a first spring and the movable sleeve assembly further includes a second spring attached to the outer movable sleeve on an opposite side of the outer movable sleeve from the first spring.

The conduit of any preceding clause, wherein the first spring has a greater spring constant than the second spring.

A lubrication system including an oil reservoir and an oil sump. The oil reservoir is configured to hold oil. The oil sump is fluidly connected to the oil reservoir by the conduit of any preceding clause, wherein the hydrocarbon fluid is the oil.

The lubrication system of the preceding clause, further comprising a pump fluidly connected to each of the oil reservoir and the oil sump and configured to circulate the oil through the conduit.

A gas turbine engine including the lubrication system of any preceding clause, a compressor section, a combustion section, and a turbine section. The compressor section includes at least one rotor, the at least one rotor being configured to compress air flowing therethrough. The combustion section is configured to mix fuel with the compressed air and to combust the mixture of fuel and air to generate combustion products. The turbine section includes at least one turbine configured to be driven by the combustion products, wherein the compressor section, the combustion section, and the turbine section together define at least part of a core air flow path, the conduit being located in the core air flow path.

The gas turbine engine of the preceding clause, further comprising at least one frame, the frame including at least one service tube assembly, the service tube assembly including the conduit.

The gas turbine engine of any preceding clause, wherein the frame includes a plurality of service tube assemblies.

The gas turbine engine of any preceding clause, wherein the frame is a turbine rear frame.

The gas turbine engine of any preceding clause further comprises a shaft connecting the at least one turbine with the at least one rotor, and a bearing supporting the shaft, the frame providing structural load paths from the bearing.

The gas turbine engine of any preceding clause, wherein the lubrication system is configured to provide oil to the bearing.

A self-cleaning conduit for a hydrocarbon fluid including a tube and a mesh. The tube has an interior surface defining a flow passage for the hydrocarbon fluid. The mesh is positioned within the flow passage to abut the interior surface and is movable along the interior surface to break-up deposits on the interior surface. The mesh is characterized by a mesh activation parameter (MAP) from one ten thousandths to six tenths.

The conduit of the preceding clause, wherein the mesh activation parameter (MAP) is from one tenth to three tenths.

The conduit of any preceding clause, wherein the hydrocarbon fluid is oil, and wherein the conduit is configured to be operated at a working temperature ratio from four tenths to one.

The conduit of any preceding clause, wherein the mesh is characterized by an absolute value of a deformation factor from one tenth to nine tenths.

The conduit of any preceding clause, wherein the mesh is characterized by an absolute value of a deformation factor from seven tenths to nine tenths.

The conduit of any preceding clause, wherein the mesh has a mesh density between one tenth and one.

The conduit of any preceding clause, wherein the mesh has a mesh density from two tenths to five tenths.

The conduit of any preceding clause, wherein the mesh is a sleeve.

The conduit of any preceding clause, wherein the mesh is formed of a shape memory alloy.

The conduit of any preceding clause, wherein the shape memory alloy is one of a nickel-titanium alloy, a cobalt-nickel-aluminum alloy, or a nickel-iron-gallium alloy.

The conduit of any preceding clause, wherein the tube is a metal having a Young's modulus, the shape memory alloy has a Young's modulus, and a ratio of the Young's modulus of the mesh to the Young's modulus of the tube is a stiffness ratio. The stiffness ratio is from two tenths to ninety-six hundredths.

The conduit of any preceding clause, wherein the stiffness ratio is from five tenths to seven tenths.

A lubrication system including an oil reservoir and an oil sump. The oil reservoir is configured to hold oil. The oil sump is fluidly connected to the oil reservoir by the conduit of any preceding clause, wherein the hydrocarbon fluid is the oil.

The lubrication system of the preceding clause further comprises a pump fluidly connected to each of the oil reservoir and the oil sump and configured to circulate the oil through the conduit.

A gas turbine engine including the lubrication system of any preceding clause, a compressor section, a combustion section, and a turbine section. The compressor section includes at least one rotor, the at least one rotor being configured to compress air flowing therethrough. The combustion section is configured to mix fuel with the compressed air and to combust the mixture of fuel and air to generate combustion products. The turbine section includes at least one turbine configured to be driven by the combustion products. The compressor section, the combustion section, and the turbine section together define at least part of a core air flow path, the conduit being located in the core air flow path.

The gas turbine engine of the preceding clause, further comprising at least one frame, the frame including at least one service tube assembly, the service tube assembly having the conduit.

The gas turbine engine of any preceding clause, wherein the frame includes a plurality of service tube assemblies.

The gas turbine engine of any preceding clause, wherein the frame is a turbine rear frame.

The gas turbine engine of any preceding clause further comprises a shaft connecting the at least one turbine with the at least one rotor and a bearing supporting the shaft, the frame providing structural load paths from the bearing.

The gas turbine engine of any preceding clause, wherein the lubrication system is configured to provide oil to the bearing.

A method of installing a movable sleeve into a conduit for a hydrocarbon fluid. The movable sleeve is a mesh sleeve including a mesh, and the conduit includes a tube. The method includes crimping the mesh sleeve and inserting the crimped mesh sleeve into the tube.

The method of the preceding clause, wherein the mesh includes a plurality of strands formed of a shape memory alloy.

The method of the any preceding clause, wherein the mesh sleeve is crimped at a temperature and the mesh sleeve is inserted into the tube at a temperature maintaining the mesh of the mesh sleeve in the same metallurgical phase as the phase used in the crimping step.

The method of the any preceding clause, further comprising heating the mesh sleeve to expand the crimped mesh sleeve within the tube.

The method of the any preceding clause, further comprising maintaining a crimping force as the crimped mesh sleeve is inserted into the tube and releasing the crimping force to expand the crimped mesh sleeve within the tube.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A self-cleaning conduit for a hydrocarbon fluid, the conduit comprising:
   a tube having an interior surface defining a flow passage for the hydrocarbon fluid; and
   a mesh positioned within the flow passage to abut the interior surface and movable along the interior surface to break-up deposits on the interior surface, the mesh being characterized by a mesh activation parameter (MAP) from one ten thousandths to six tenths.

2. The conduit of claim 1, wherein the mesh activation parameter (MAP) is from one tenth to three tenths.

3. The conduit of claim 1, wherein the hydrocarbon fluid is oil, and
   wherein the conduit is configured to be operated at a working temperature ratio from four tenths to one.

4. The conduit of claim 1, wherein the mesh is characterized by an absolute value of a deformation factor from one tenth to nine tenths.

5. The conduit of claim 1, wherein the mesh is characterized by an absolute value of a deformation factor from seven tenths to nine tenths.

6. The conduit of claim 1, wherein the mesh has a mesh density between one tenth and one.

7. The conduit of claim 1, wherein the mesh has a mesh density from two tenths to five tenths.

8. The conduit of claim 1, wherein the mesh is a sleeve.

9. The conduit of claim 1, wherein the mesh is formed of a shape memory alloy.

10. The conduit of claim 9, wherein the shape memory alloy is one of a nickel-titanium alloy, a cobalt-nickel-aluminum alloy, or a nickel-iron-gallium alloy.

11. The conduit of claim 9, wherein the tube is a metal having a Young's modulus, the shape memory alloy has a Young's modulus, and a ratio of the Young's modulus of the mesh to the Young's modulus of the tube is a stiffness ratio, the stiffness ratio being from two tenths to ninety-six hundredths.

12. The conduit of claim 11, wherein the stiffness ratio is from five tenths to seven tenths.

13. A lubrication system comprising:
   an oil reservoir configured to hold oil; and
   an oil sump fluidly connected to the oil reservoir by the conduit of claim 1, wherein the hydrocarbon fluid is the oil.

14. The lubrication system of claim 13, further comprising a pump fluidly connected to each of the oil reservoir and the oil sump and configured to circulate the oil through the conduit.

15. A gas turbine engine comprising:
   the lubrication system of claim 13;
   a compressor section including at least one rotor, the at least one rotor being configured to compress air flowing therethrough;
   a combustion section configured to mix fuel with the compressed air and to combust the mixture of fuel and air to generate combustion products; and
   a turbine section including at least one turbine configured to be driven by the combustion products,
   wherein the compressor section, the combustion section, and the turbine section together define at least part of a core air flow path, the conduit being located in the core air flow path.

16. The gas turbine engine of claim 15, further comprising at least one frame, the frame including at least one service tube assembly, the service tube assembly having the conduit.

17. The gas turbine engine of claim 16, wherein the frame includes a plurality of service tube assemblies.

18. The gas turbine engine of claim 16, wherein the frame is a turbine rear frame.

19. The gas turbine engine of claim 16, further comprising a shaft connecting the at least one turbine with the at least one rotor; and a bearing supporting the shaft, the frame providing structural load paths from the bearing.

20. The gas turbine engine of claim 19, wherein the lubrication system is configured to provide oil to the bearing.

\* \* \* \* \*